United States Patent
Vaghi

(10) Patent No.: US 6,249,778 B1
(45) Date of Patent: Jun. 19, 2001

(54) INTEGRATED ELECTRONIC SCALE, AND A SYSTEM AND METHOD WHICH USES THE SCALE AUTOMATICALLY TO COMPUTE POSTAL/CARRIER RATES

(75) Inventor: Nino Richard Vaghi, Bethesda, MD (US)

(73) Assignee: Vaghi Family Intellectual Properties, LLC, McLean, VA (US)

( * ) Notice: Subject to any disclaimer, the term of this patent is extended or adjusted under 35 U.S.C. 154(b) by 0 days.

(21) Appl. No.: 09/223,172

(22) Filed: Dec. 30, 1998

(51) Int. Cl.[7] ................................................... G07B 17/00
(52) U.S. Cl. ..................... 705/407; 177/168; 177/170; 177/243; 705/401
(58) Field of Search .................. 177/25.15, 168, 177/170, 210 R, 211, 212, 225, 229, 230, 231, 238, 243; 705/401, 407, 408

(56) References Cited

U.S. PATENT DOCUMENTS

| D. 302,798 | 8/1989 | Wolff, Jr. ........................... D10/91 |
| D. 305,103 | 12/1989 | Kennedy ........................... D10/91 |
| D. 329,227 | 9/1992 | Kurth et al. ....................... D14/100 |
| 3,692,988 | * 9/1972 | Dlugos et al. ..................... 705/407 |
| 4,377,214 | * 3/1983 | Hansen et al. .................... 177/25.15 |
| 4,495,581 | * 1/1985 | Piccione ............................ 705/402 |
| 4,597,457 | 7/1986 | Ikekita ................................ 177/25 |
| 4,638,439 | 1/1987 | Daniels .............................. 364/446 |
| 4,787,046 | * 11/1988 | Feinland et al. ................... 705/407 |
| 4,814,995 | 3/1989 | Daniels, Jr. ....................... 364/464.02 |
| 5,069,299 | * 12/1991 | Haroutel ............................ 177/25.15 |
| 5,538,234 | * 7/1996 | Yankloski ........................... 271/11 |
| 5,606,507 | 2/1997 | Kara ................................... 364/464.18 |
| 5,615,120 | 3/1997 | Schwartz et al. ................. 364/464.17 |
| 5,724,245 | 3/1998 | Maher et al. ...................... 364/464.18 |

FOREIGN PATENT DOCUMENTS 2-240794 * 9/1990 (JP) ..................................... 235/432

OTHER PUBLICATIONS

"U.S. Mail Order Business Boosted by Electronics", Drug & Cosmetic Industry, Oct. 1, 1998, p. 48B.*

* cited by examiner

Primary Examiner—Edward R. Cosimano
(74) Attorney, Agent, or Firm—McGuire, Woods, Battle & Boothe, LLP

(57) ABSTRACT

An electronic scale integrally formed within the housing of a piece of office equipment increases a user's work space in a home or business environment. The piece of equipment may be a personal computer or one of its peripheral devices. A mailing system automatically computes postal and/or private carrier rates for items of mail based on weight signals derived from the electronic scale. Since the scale is integrated into the computer, all mailing tasks are performed at a user's desk using the least space possible. The system is performed in accordance with a computer program which steps a user through the postage-computing method using one or more interactive display screens.

35 Claims, 22 Drawing Sheets

NR/ MAILING SYSTEM

WEIGHT
___ lbs. ___ oz.

ZONE
o ZONE 1   o ENTER NATIONAL
o ZONE 2
o ZONE 3
o ZONE 4

CLASS
o FIRST CLASS
o SECOND CLASS
o UPS

TOTAL RATE
$ _____

SELECT CARRIER

ADDITIONAL SERVICES

FIG.22

INTEGRATED ELECTRONIC SCALE, AND A SYSTEM AND METHOD WHICH USES THE SCALE AUTOMATICALLY TO COMPUTE POSTAL/CARRIER RATES

BACKGROUND OF THE INVENTION

1. Field of the Invention

This invention generally relates to weighing systems, and more particularly to an electronic scale and a system and method which uses the electronic scale to compute postal and private carrier rates for letters, packages, parcels, and other items of mail.

2. Description of the Related Art

Even with E-mail and other forms of electronic data transfer which are so prevalent today, traditional mail, either through the U.S. Postal Service or by private carrier, remains the dominant form of information exchange. In order to successfully send an item through the mail, correct postage must, of course, be computed. To determine postage, a number of factors must be taken into consideration, not the least of which include the class, destination, and weight of the item being sent. At least three methods are currently in use for determining the weight of mail, and as will be apparent below all of them fall short of being optimum.

The traditional method of weighing mail involves using an analog scale. According to this method, a letter is weighed on the scale and postage is then determined by comparing the scale measurement to a rate table issued by a mail carrier. This method has proven to be inefficient, especially for businesses, because it is an entirely manual process. To mail a letter, for example, a secretary is often required to go to a mail room to access the scale and rate tables. In other instances, the scale is kept at the secretary's desk, making a trip to the mail room unnecessary. Even under these circumstances, however, the process is inefficient because keeping the scale on the secretary's desk reduces her usable work space. Either way, the traditional method of computing postage is inefficient.

An improved method of computing postage involves using an electronic, programmable postal meter. Electronic postal meters are highly favored by businesses because they essentially automate the mailing process. While meters of this type come in varying sizes, from small stand-alone units to full-size systems capable of weighing packages of varying weights and sizes, all have the same basic features: a keyboard for entering rate data into a meter memory, an electronic scale, and a processor for computing postage based on the stored rate data and weight measurements taken by the scale. U.S. Pat. Nos. 5,724,245, 5,615,120, 4,814,995, and D 305,103 disclose meters of this type.

In spite of their advantages, electronic postal meters have at least three drawbacks. First, postal meters cannot be bought but only rented for a fee. These rental fees contribute to operating expenses, and sometimes significantly depending upon the size of the renter.

Second, electronic postal meters require considerable maintenance because, one, the scales connected to the meters must be manually adjusted every time new postal rates are issued and, two, the meters must be periodically inspected, serviced, and replaced, often at additional expense to the renter.

Third, most electronic postal meters in use today are of a size which, in practical terms, are unsuitable for use on a worker's desk. Consequently, postal meters are almost universally kept in mail rooms and thus have associated with them many of the inefficiencies attendant to analog scales.

A further improved method of computing postage borrows from the power of the personal computer. This method eliminates the need for electronic postal meters because the functions performed by the meter processor are replaced by a CPU running a postal computation program. Computer programs of this type, exemplified by U.S. Pat. No. 5,606,507 to Kara, are typically Windows-type programs which automatically compute postage based on weight measurements taken by an electronic scale connected to a communications port of the computer. Once postage has been computed, the program instructs a peripheral device to print an envelope or label bearing a stamp of appropriate value.

Use of a personal computer to compute postage represents a significant improvement in the art. Through the computer, a secretary can, for example, perform all mailing responsibilities at her desk, thereby streamlining the mailing process. Further, through a convenient and easily understandable graphic user interface, novices can in no time learn to use the postal program with a proficiency equal to that of trained personnel. Also, because postal programs can be purchased, they do not represent a continuing economic burden on the businesses which use them.

For all of their advantages, software-based mailing systems are not optimum because they are not fully integrated. Perhaps most significantly, while the processing functions of the electronic postal meter have been incorporated into the personal computer, its hardware components have not. This is exemplified by systems like Kara, discussed above, which still must use an electronic scale separate from the computer to obtain the weight measurements required for computing postage. Use of a separate scale is inefficient because, like an analog scale, it consumes desk space which could be put to more productive use.

A need therefore exists for a system for computing postal and carrier rates which is fully integrated so that desk space is not unnecessarily consumed and which therefore is more convenient and efficient compared with postage-computing systems presently in use.

SUMMARY OF THE INVENTION

It is one object of the present invention to provide a system for computing postage and/or private carrier rates which is more efficient than those presently in use.

It is another object of the present invention to achieve the above object by integrally forming an electronic scale into the housing of a piece of office equipment, so that all elements for computing rates are conveniently and compactly located on a user's desk, thereby streamlining the mailing process and increasing the work space available to an individual in a home or business environment.

It is another object of the present invention to provide a postage-computing system of the aforementioned type which is software-driven to thereby further increase the efficiency of the mailing process.

It is another object of the present invention to provide an electronic scale equipped with a display which is fully integrated into a piece of office equipment to be used for purposes not necessarily related to computing postage.

The foregoing and other objects of the invention are achieved by providing an electronic scale built into the housing of a piece of equipment, such as a computer or one of its peripherals. The electronic scale includes a platform for supporting a letter, package, parcel or other item of mail, and a weighing unit having at least one support arm for transferring the weight of the mail item from the platform to a load cell within the equipment housing.

In one embodiment, the electronic scale is integrated into a base of a flat-panel display and the platform has side walls for holding packages of varying dimensions. If desired, an LCD display may be mounted on the panel housing for displaying weight measurements without having to access computer software. This embodiment proves useful for weighing items in contexts not necessarily related to determining postage.

In another embodiment, the electronic scale is integrated into the housing of a CRT display. According to this embodiment, the platform is rotatably attached to the weighing unit to, at all times, provide a user with a flat, stable weighing surface irrespective of the orientation of the CRT.

In another embodiment, the electronic scale is integrated into the housing of a CPU unit. According to one aspect of this embodiment, two spring-biased alignments shafts support a platform mounted on a top surface of the CPU unit. A load cell is then mounted on an elevated stage under a stub projecting from a bottom surface of the platform. When an item to be mailed is placed on the platform, springs around each shaft compress, allowing distal ends of the shafts to pass through holes in the base of the stage. As a result, the stub impinges on the load cell and a weight measurement signal is derived.

In still another embodiment, the electronic scale is integrated into a printer. According to one aspect of this embodiment, the weighing platform is disposed adjacent a paper discharge area of the printer. Once the pages of a letter are printed, they may be enclosed within an envelope and placed on the platform to obtain a weight measurement. According to a second aspect of this embodiment, the weighing platform is made substantially co-extensive with the paper discharge area, so that the pages printed out can be weighed along with an envelope without ever requiring the user to touch or otherwise physically remove the pages. According to third aspect, the weighing unit and stage may be integrally formed along a base of the printer.

In one or more of the above embodiments, the platform may be removably connected to the weighing unit to allow platforms to be used for weighing items of mail of different sizes. Also, to accommodate larger parcels, the load cell may include double pivot arms for reinforcing the stability of the weighing platform.

The system of the present invention advantageously uses the integrated electronic scale described herein to compute postal/carrier rates in accordance with a program stored in a personal computer. In operation, the program computes these rates based on weight measurement signals derived from the scale, as well as other mailing parameters entered into the computer by keyboard or mouse. Preferably, the program is adapted to operate within a Windows environment for the user's convenience.

The method of the present invention is implemented in accordance with the system described above. According to this method, postal/carrier rate information is loaded into the personal computer either manually or from a disk or the Internet. A postal program is then initiated, for example, by clicking an icon on a computer screen or merely by placing an item to be weighed on the scale. The program computes a rate based on a weight measurement from the scale and class, zone, and other parameters entered by the user or pre-programmed into the system. If desired, the program may be written so that these parameters are entered in response to requests sequentially displayed on the computer screen. A label or envelope bearing a mark corresponding to the postal rate is then printed by a peripheral connected to the computer.

BRIEF DESCRIPTION OF THE DRAWINGS

FIG. 22 shows a comprehensive display screen which may be used to implement the steps of the method of the present invention.

DESCRIPTION OF THE PREFERRED EMBODIMENTS

The present invention is, in one respect, an electronic scale integrally formed into a piece of office equipment for reducing desk clutter and thus maximizing the efficient use of an employee's work space. The present invention is, in a second respect, a software-driven system which uses the integrated electronic scale to automatically compute postal/private carrier rates for letters, packages, parcels, and other items to be mailed or shipped. The present invention is, in a third respect, a method for determining these rates in accordance with the system described herein. These and other aspects of the present invention are discussed in seriatim below with reference to FIGS. 1–22.

Figure 1:
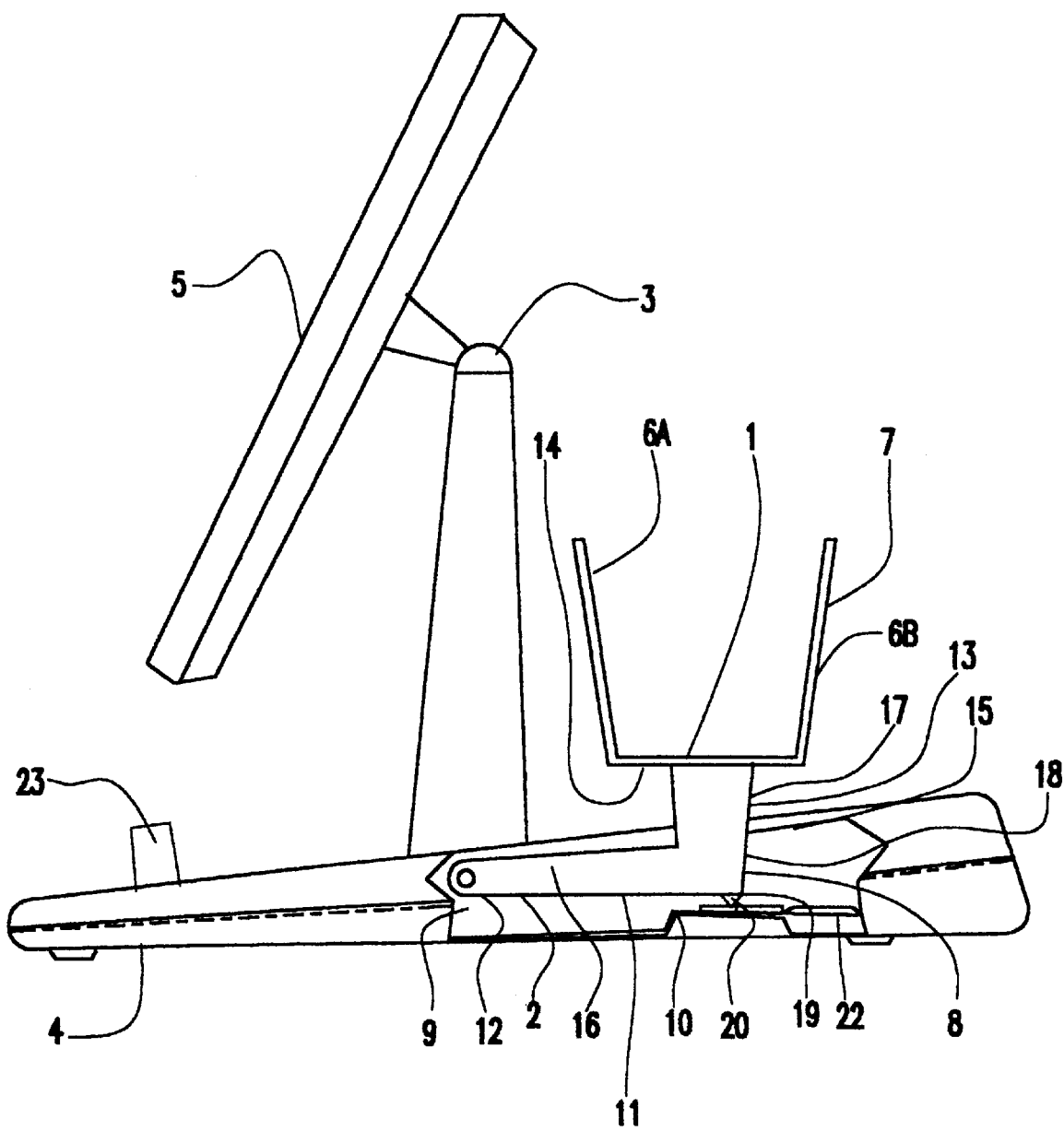
FIG. 1 is a diagram of a first embodiment of the integrated electronic scale of the present invention.

Referring to FIG. 1, a first embodiment of the electronic scale of the present invention includes a platform 1 and a weighing unit 2 integrated into a flat-panel display 3 having a base 4 for supporting a display screen 5. The platform is equipped with at least two side walls 6a and 6b of a container 7 for holding items of mail. Preferably, container 7 has dimensions sufficient to accommodate letters, envelopes, and packages of varying sizes.

Weighing unit 2 is incorporated within a rear portion of the base of the flat-panel display, so that the container 7 is positioned behind and/or below the display screen. As shown, weighing unit 2 includes a pivot mount 9, a pivot arm 11, and a force transducer in the form of load cell 20. Pivot mount 9 is fixed to an interior surface 10 of the base. Pivot arm 11 has a first end 12 rotatably connected to the pivot mount and a second end 13 in contact with a bottom surface 14 of the platform through a slot 15 formed in the base. Preferably, the pivot arm is constructed from two smaller arm portions 16 and 17 which are angularly attached, e.g. at right angles, to form an elbow area 18.

For this and all other embodiments discussed herein, load cell 20 may be of any conventional type with a suitable weight capacity, e.g., for lighter-weight mail, load cell 20 may have a 10-pound capacity. Those skilled in the art can appreciate, however, that load cells of other capacities may be used. Also, while the force transducer of the invention is specifically described herein as a load cell, those skilled in the art can appreciate that other types of force transducers, including digital or analog, may be used.

Projecting from the elbow area of arm 11 is a stub 19 located adjacent load cell 20, which is fixed to a raised interior surface of base 4. If desired, arm 11 may be upwardly biased so that stub 19 does not contact load cell 20 when container 7 is empty, or arm 11 may be arranged so that stub 19 and load cell 20 are always in contact.

In operation, an item to be mailed, preferably enclosed within an envelope or the like, is placed in container 7 by a user. The weight of the letter applies a force to pivot arm 11, which is transmitted to load cell 20 through stub 19. Load cell 20 converts this force into weight measurement signals which are then conveyed through signal lines 22.

For weighing heavier parcels, the structural stability of weighing unit 2 may be enhanced, for example, using a dual pivot arm-pivot mount configuration such as the one shown FIG. 6 to be discussed in greater detail below.

Figure 2:
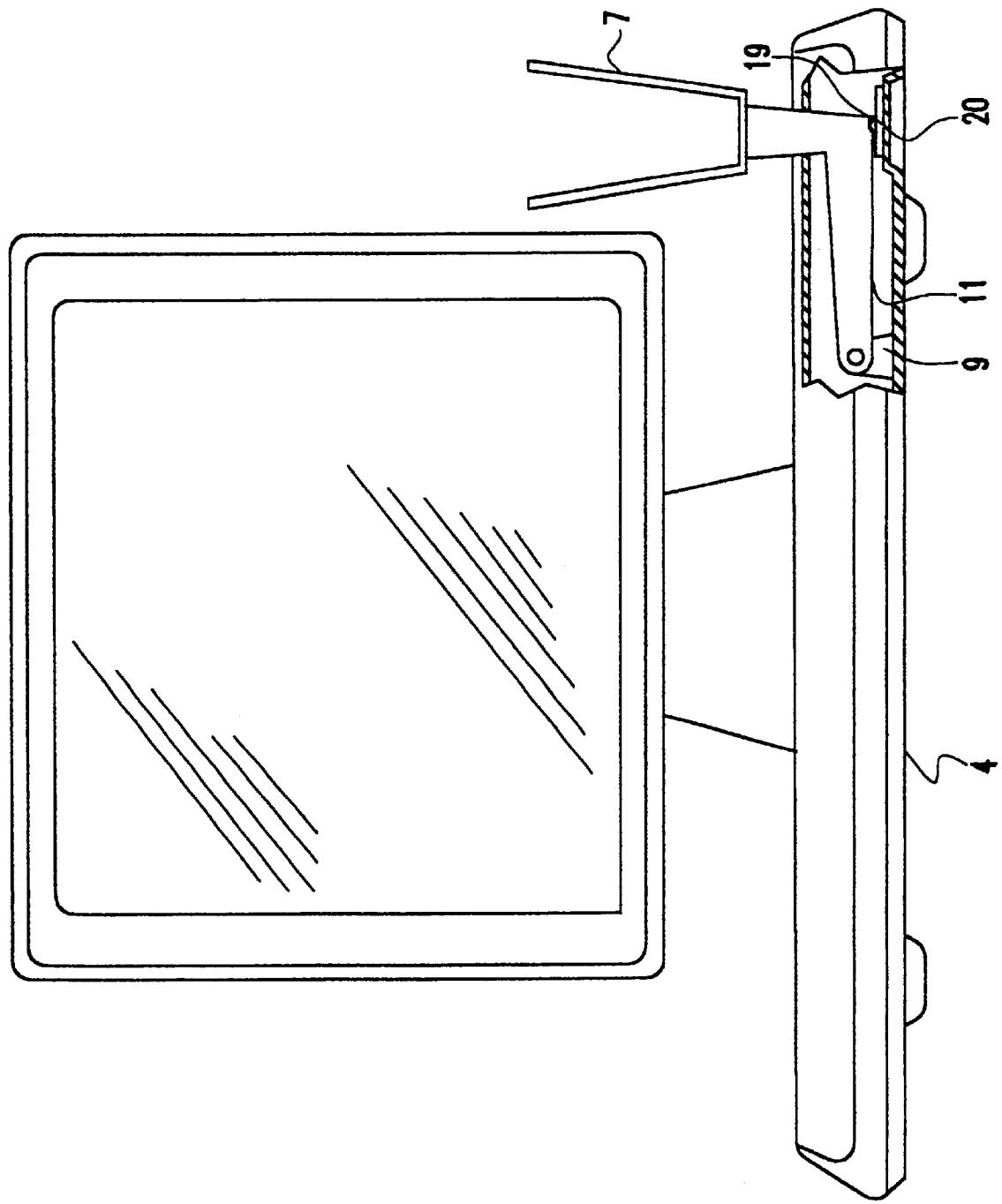
FIG. 2 is a diagram of a second embodiment of the integrated electronic scale of the present invention.

Referring to FIG. 2, a second embodiment of the electronic scale of the present invention is integrally formed into an extended side portion of the base of a flat-panel display. Since this embodiment is similar to the first embodiments, like numerals have been used to identify features of the invention depicted therein.

Figure 3:
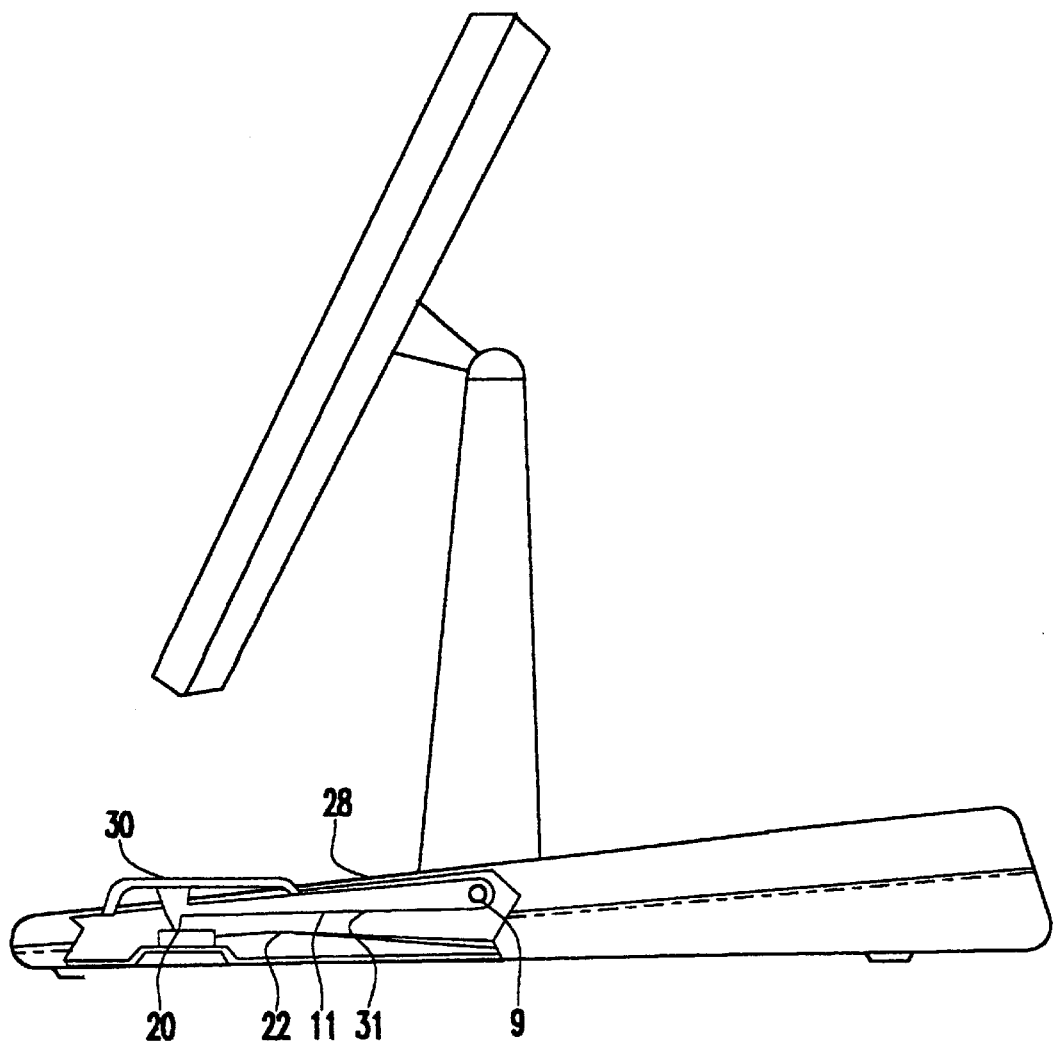
FIG. 3 is a diagram of a third embodiment of the integrated electronic scale of the present invention.

Referring to FIG. 3, a third embodiment of the electronic scale of the present invention is integrally formed into a front portion 28 of the base of a flat-panel display. In this embodiment, platform 30 has a bottom surface connected to a weighing unit 31 which is substantially the same as the weighing unit shown in FIG. 1. Unlike FIG. 1, however, platform 30 has no side walls and, if desired, may be removably connected to weighing unit 31 so that differently shaped platforms/containers may be connected.

Figure 4:
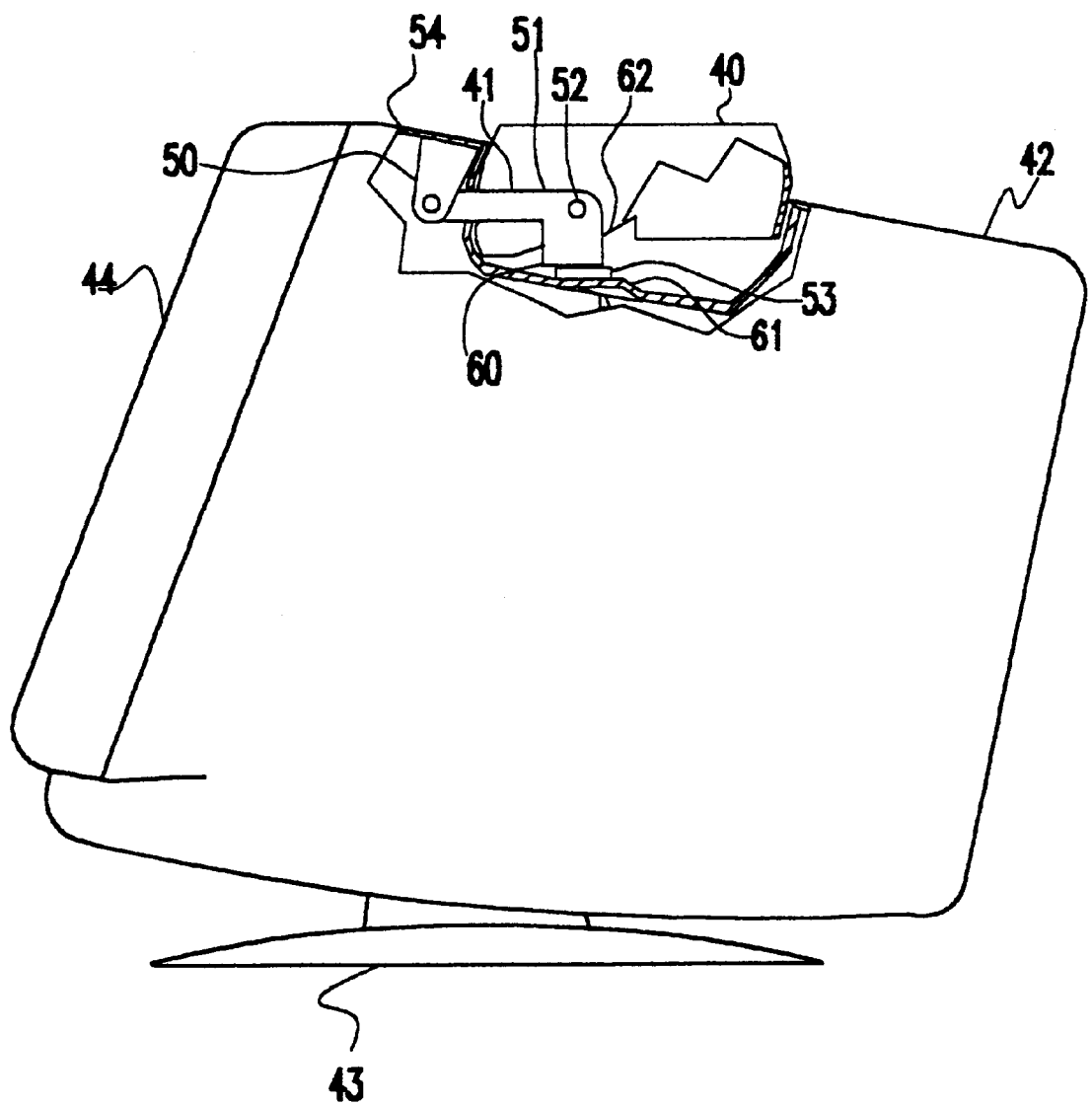
FIG. 4 is a diagram of a fourth embodiment of the integrated electronic scale of the present invention.
Figure 5:
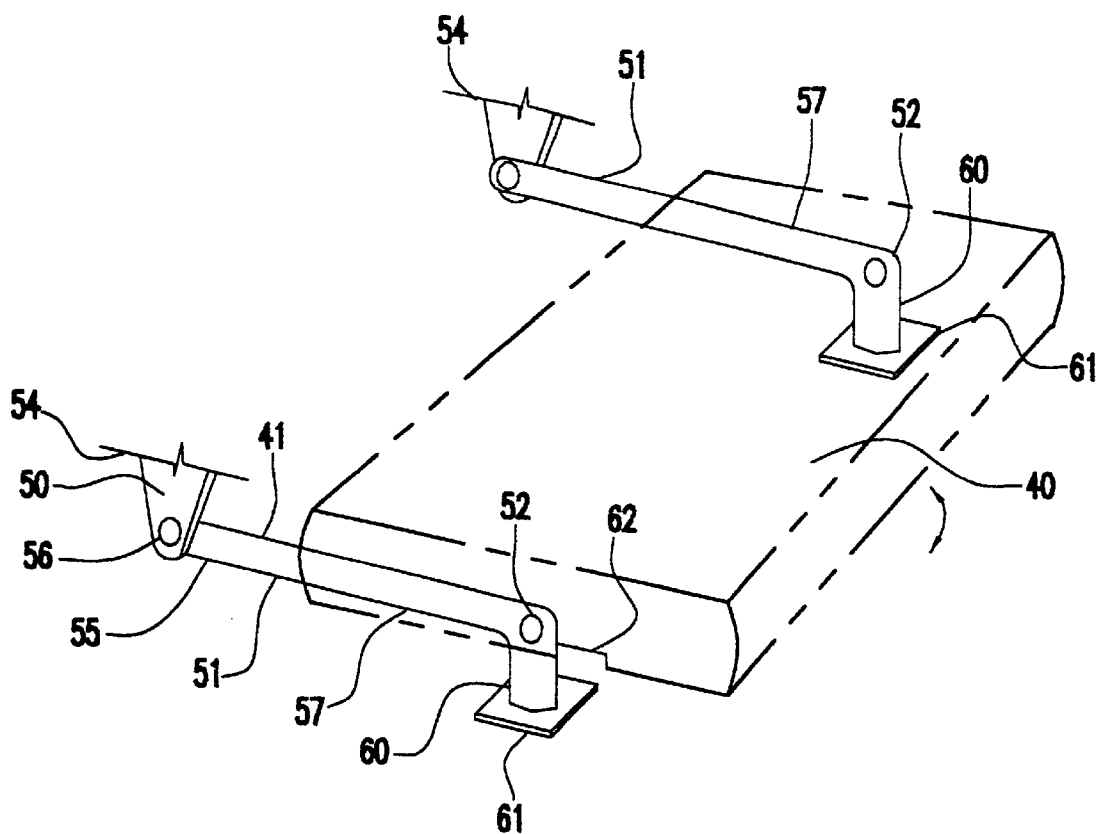
FIG. 5 is a diagram showing another view of the fourth embodiment of the integrated electronic scale of the present invention.

Referring to FIGS. 4 and 5, a fourth embodiment of the electronic scale of the present invention includes a platform 40 and a weighing unit 41 formed integrally with a top surface of a CRT monitor 42, having a base 43 for supporting a display screen 44. Preferably, platform 40 is hollow.

Weighing unit 41 includes pivot mounts 50, pivot arms 51, alignment pivots 52, and a load cell 53, which is fixed to a stage 61 connected to the interior surface of the CRT housing. The pivot mounts are fixed to an interior surface 54 of the CRT housing. The pivot arms each have a first end 55 rotatably connected to a respective pivot mount by a pin 56. Attached to second ends 57 of the pivot arms are alignment pivots 52 which rotatably connect the pivot arms to platform 40. The alignment pivots advantageously allow platform 40 to rotate into a position parallel to the floor regardless of the orientation of the monitor, thereby at all times giving a user access to a flat, stable surface on which to place items to be weighed. Opening 62 is formed along a bottom surface of platform 40 to provide clearance relative to load cell 53 when platform 40 rotates in a clockwise direction.

In operation, a letter enclosed within an envelope is placed on platform 40. The weight of the letter applies a force to pivot arms 51, which rotate about the pivot mounts to allow a distal end 60 of one pivot arm to impinge upon load cell 53. Load cell 53 then outputs weight measurement signals through signal lines 62.

Figure 6:
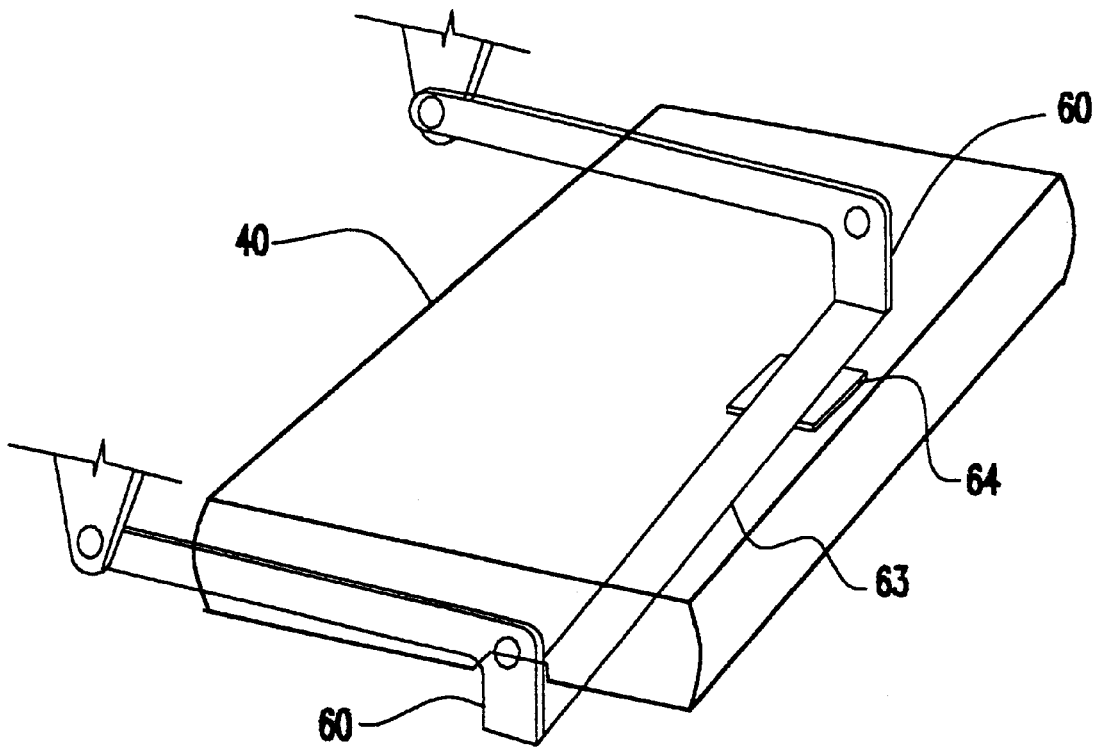
FIG. 6 is a diagram of a second aspect of the fourth embodiment of the integrated electronic scale of the present invention.

Referring to FIG. 6, according to a second aspect of the fourth embodiment, the distal ends 60 of each pivot arm may be connected by an arm 63, and load cell 64 may be positioned under arm 53 for measuring weight on platform 40.

Figure 7:
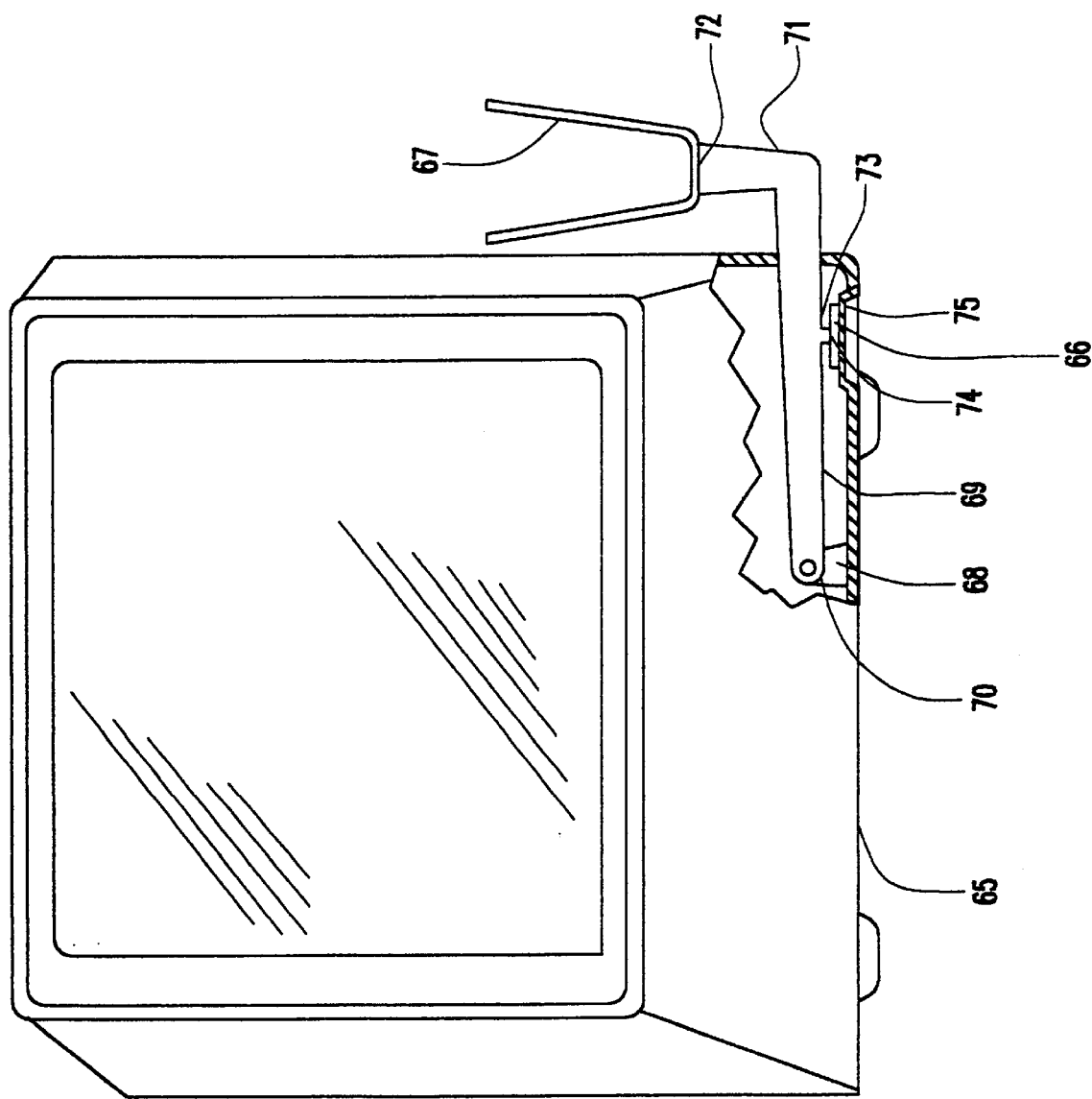
FIG. 7 is a diagram of fifth embodiment of the integrated electronic scale of the present invention.

Referring to FIG. 7, a fifth embodiment of the electronic scale of the present invention may be integrated into the bottom portion 65 of the CRT housing. As shown, the present invention includes a weighing unit 66 connected to a holder 67 projecting from the bottom of the CRT housing. The weighing unit includes a pivot mount 68, a pivot arm 69 having a first end 70 connected to the pivot mount and a second end 71 connected to a bottom surface 72 of the holder. Projecting from the pivot arm is a stub 73 for transferring the weight of an item of mail in the holder to a load cell 74 mounted on an elevated platform 75 within the CRT housing.

Figure 8:
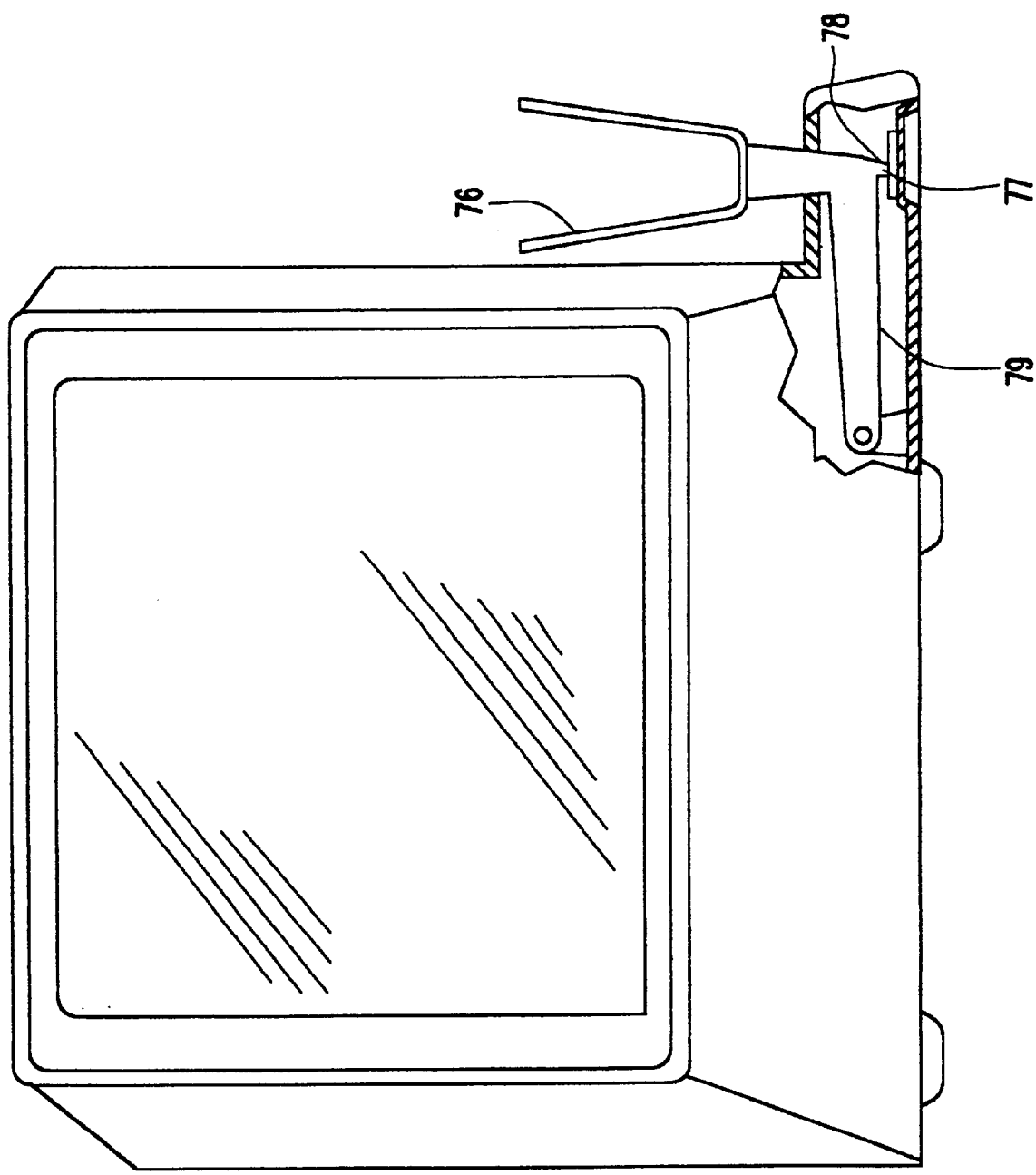
FIG. 8 is diagram of a sixth embodiment of the integrated electronic scale of the present invention.

Referring to FIG. 8, a sixth embodiment of the electronic scale of the present invention is integrally formed into a bottom portion of a CRT housing which projects from a side thereof. Like the fifth embodiment shown in FIG. 7, a holder 76 projects from a side of the CRT housing, and as such, a stub 78 for transferring the weight of mail in the holder to load cell 77 projects from a pivot arm 79.

While the fifth and sixth embodiments of the invention have been described specifically with respect to a CRT monitor, those skilled in the art can appreciate that the electronic scale of the present invention may be integrated into other display devices including analog or digital televisions. This embodiment, thus, would be particularly advantageous when used in conjunction with internet access software implemented on a television such as WebTV.

Figure 9:
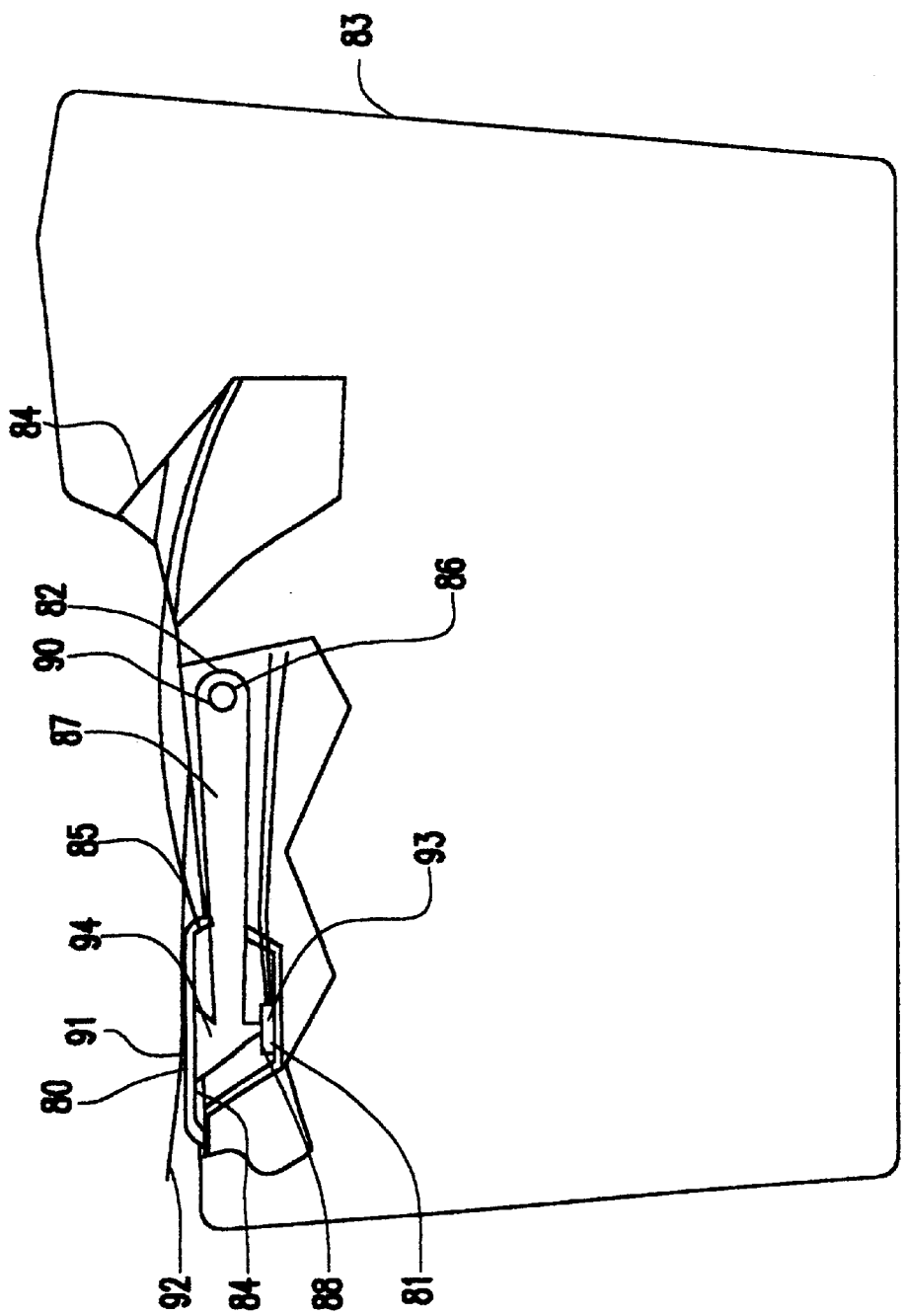
FIG. 9 is a diagram of a seventh embodiment of the electronic scale of the present invention.

Referring to FIG. 9, a seventh embodiment of the electronic scale of the present invention includes a platform 80 and a weighing unit 81 formed integrally with a paper discharge area 82 of a printer 83, which may be a laser, dot-matrix, or any other type of printer. In order to allow papers to be discharged smoothly and continuously from a paper discharge port 84 of the printer, platform 80 is preferably tilted at an angle coincident with the angle of a ramp 85 located at an end of the paper discharge area.

Weighing unit 81 includes a pivot mount 86, a pivot arm 87, and a load cell 88. The pivot mount may be fixed to an interior surface of the paper discharge area. The pivot arm has a first end 90 rotatably connected to the pivot mount, a second end 91 in contact with a bottom surface of the platform, and a stub 93 in contact with load cell 88.

In operation, a letter 92 is printed out from the printer, enclosed within an envelope, and placed on platform 80.

Load cell 88 converts the force applied by the letter into weight measurement signals which are conveyed by signal lines 94.

Figure 10:
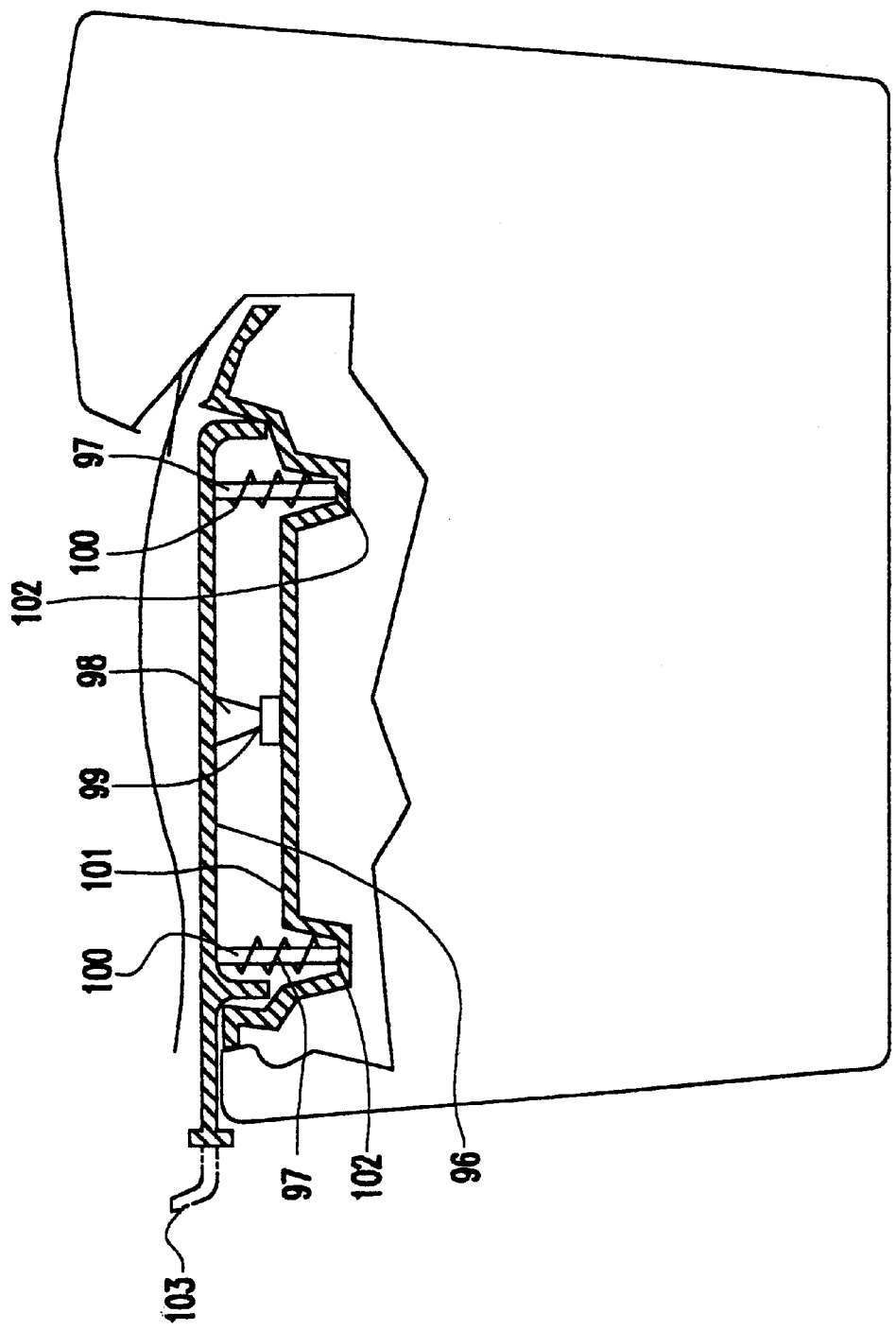
FIG. 10 is a diagram of a second aspect of the seventh embodiment of the electronic scale of the present invention.

According to a second aspect of the seventh embodiment, shown in FIG. 10, a platform 96 may be substantially co-extensive with a paper discharge area of the printer. The platform may be supported by a pair of spring-loaded support shafts 97 which allow a stub 98, projecting from platform 96, to impinge upon load cell 99 when paper is printed out. Springs 100 on the shafts are mounted to an interior stage 101 of the printer housing to allow shafts 97 to defect through holes 102 when platform 96 is weighted. If desired, a projection 103 of the platform may be formed to provide additional clearance for the printed paper.

In operation, a letter can be printed out and an appropriately sized envelope placed on top of the letter. Since the load cell bears the weight of the letter and envelope, correct postage can be determined without the user ever having to touch the printer output, i.e., without requiring the user to pick up the pages of the letter, fold them, and place them in the envelope.

Figure 11:
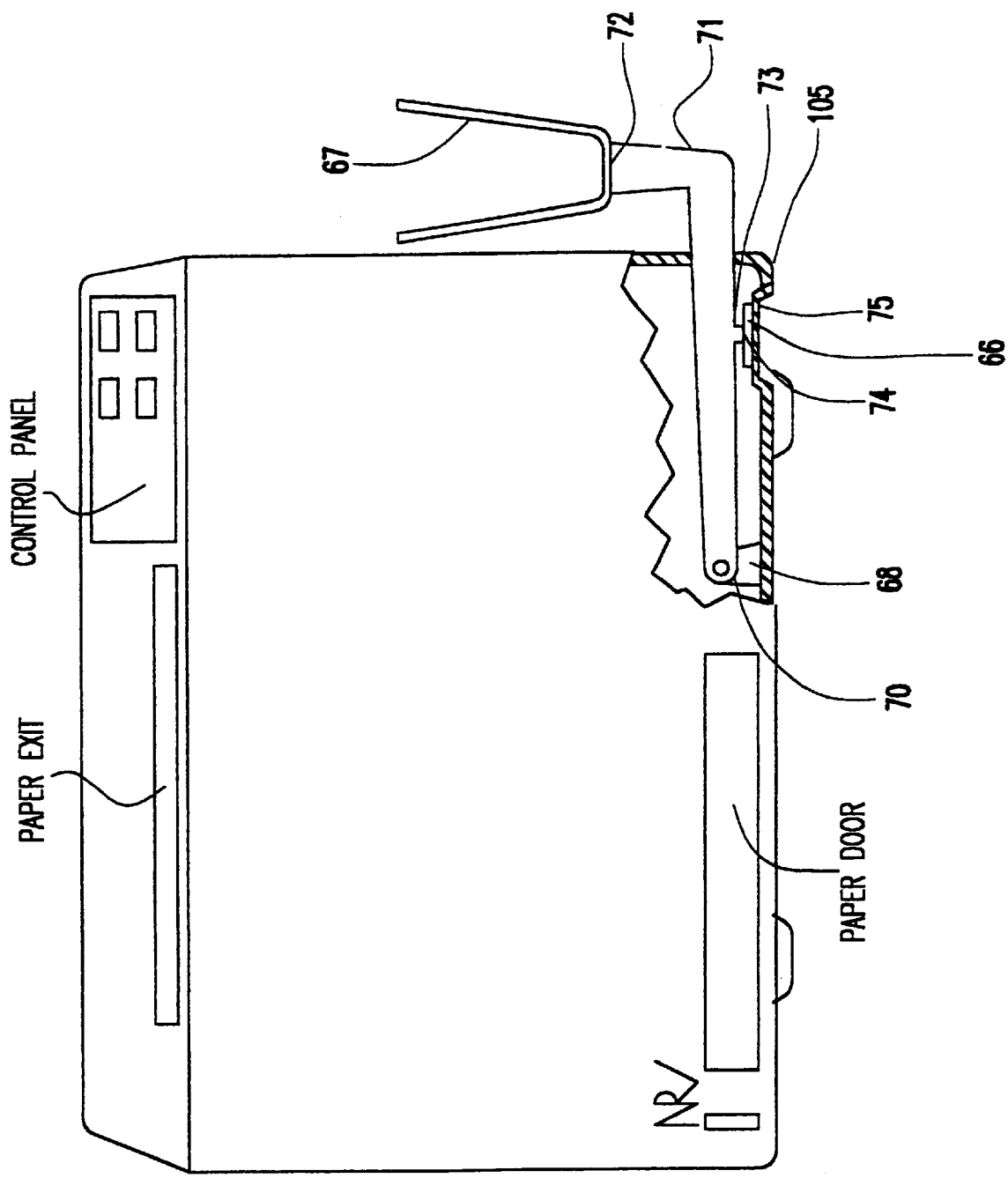
FIG. 11 is a diagram of an eighth embodiment of the electronic scale of the present invention.
Figure 12:
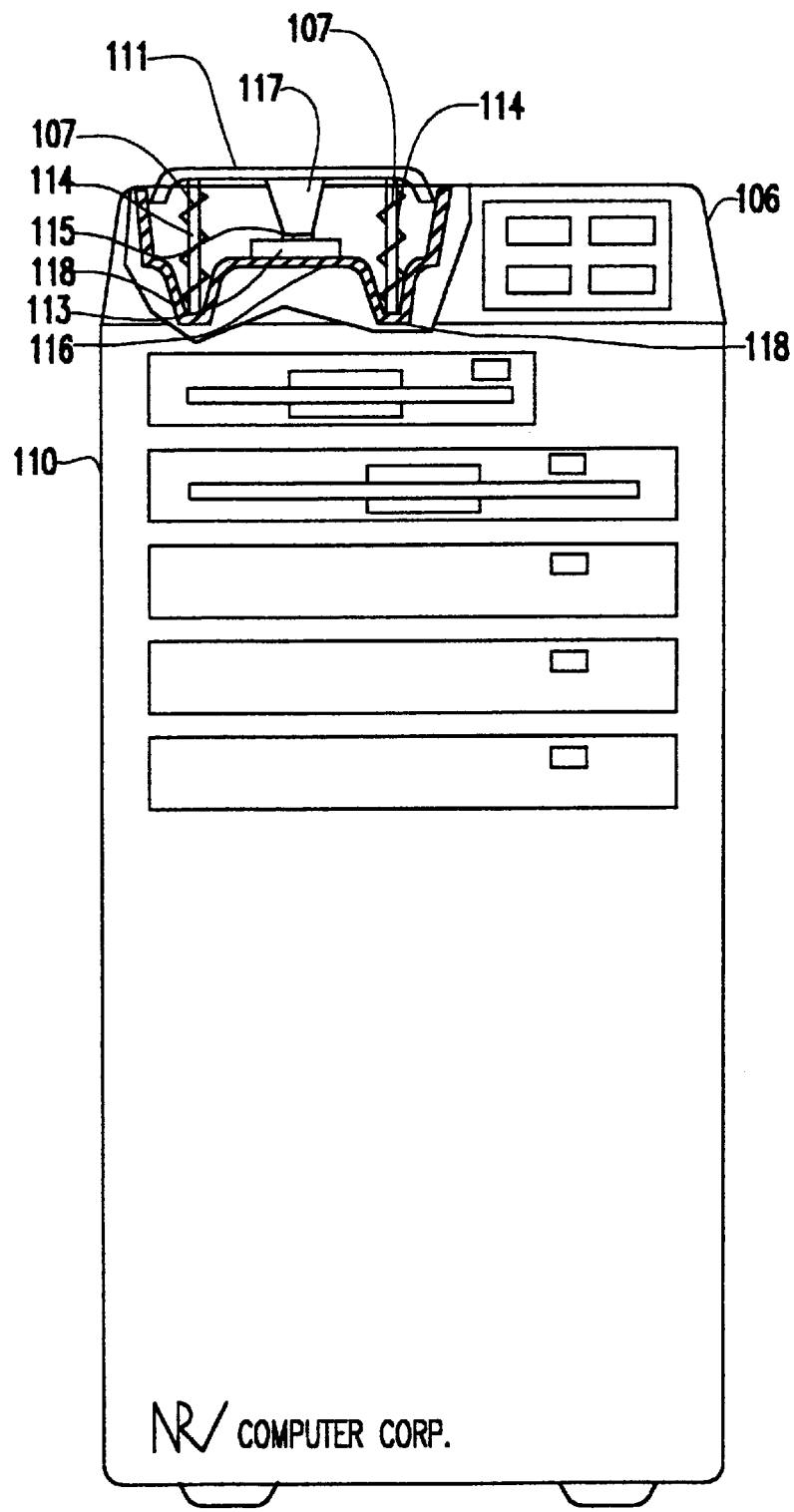
FIG. 12 is a diagram a ninth embodiment of the electronic scale of the present invention.

Referring to FIG. 11, an eighth embodiment of the electronic scale of the present invention is integrally formed into a bottom portion 105 of a printer housing. This embodiment is similar to the embodiment shown in FIG. 7 and thus like reference numerals have been used to identify features therein.

A ninth embodiment of the electronic scale of the present invention is integrally formed into the housing of a CPU unit. According to a first aspect of this embodiment, shown in FIG. 12, the scale of the present invention is integrated into the top portion 106 of a CPU housing 110, and as such, includes a platform 111 connected to a weighing unit 113 formed from two support shafts 114 and a load cell 115. The load cell is preferably fixed to a base 116 at a position directly underneath a stub 117 projecting from a bottom surface of the platform. Holes 118 are formed in base 116 to provide clearance for the shafts and thus to allow stub 117 to impinge against the load cell when an item of mail is placed on the platform. Preferably, as shown, the support shafts are equipped with springs 107 to, for example, allow stub 117 to impinge upon the load cell and to give the platform a predetermined bias. Additional supports (not shown) may be included, as necessary, for increasing the stability of the support shafts.

Figure 13:
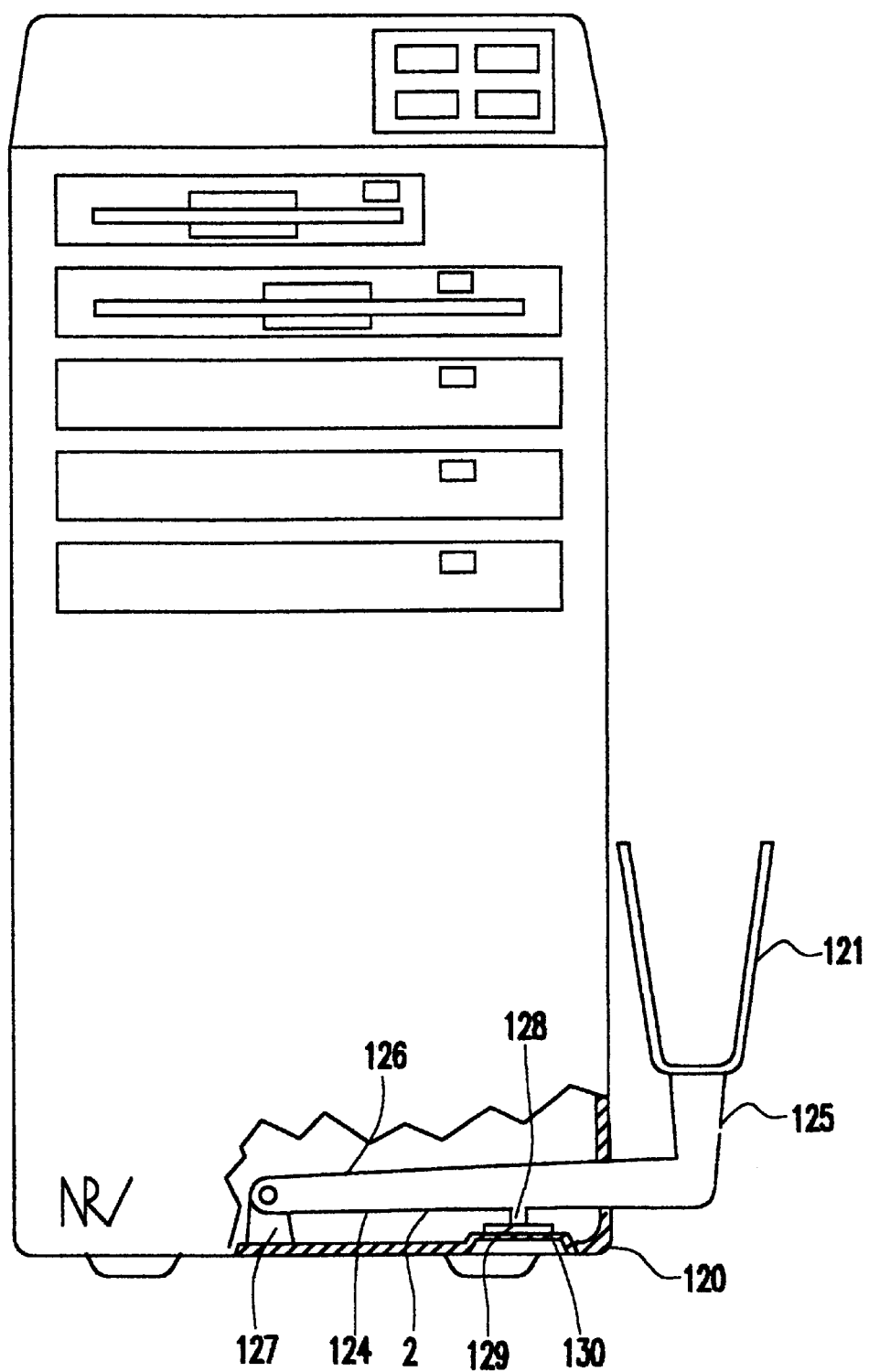
FIG. 13 is a diagram of a second aspect of the ninth embodiment of the electronic scale of the present invention.

According to a second aspect of the ninth embodiment, shown in FIG. 13, the scale of the present invention is integrated into a bottom portion 120 of the CPU housing and, as such, includes a holder 121 connected to a weighing unit 122. Similar to previous embodiments, the weighing unit includes a pivot arm 124 having a first end 125 connected to a bottom surface of the holder and a second ends 126 connected to a pivot mount 127 fixed to the CPU housing. Projecting from the pivot arm is a stub 128 for transferring the weight of mail held in the holder to a load cell 129, which is fixed to an elevated platform 130 within the CPU housing. While the CPU units depicted in FIGS. 12 and 13 have a tower configuration, those skilled in the art can appreciate that the electronic scale of the present invention may be integrated into the housing of any other type of CPU unit.

In all the embodiments discussed above, a load cell outputs weight measurement signals to signal lines. In accordance with the present invention, the signal lines may carry the weight measurement signals to several locations for processing and/or display. For example, as shown in FIG. 1, if desired, signal lines 22 may carry the weight measurements signals from load cell 20 to an LCD display 23 mounted at another location on the flat-panel display, e.g., at a front portion of base 4. The other embodiments may follow suit. As will be described in greater detail below, the signal lines of the present invention may also, or alternatively, carry weight measurement signals to the CPU of a personal computer for processing.

Figure 14A:
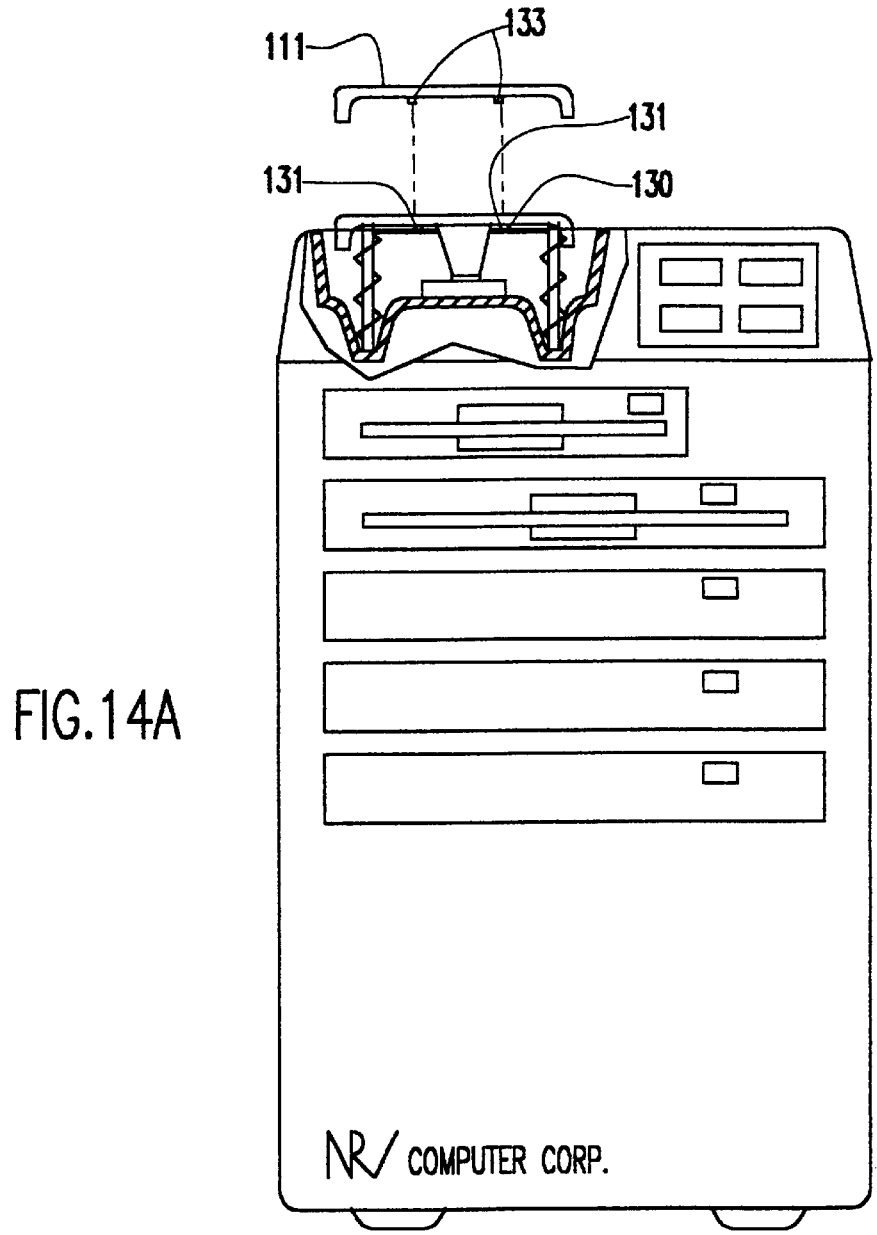
FIG. 14($a$) is a diagram showing a detachable connection of a platform used in any of the foregoing embodiments, and FIGS. 14($b$) and 14($c$) are diagrams of alternative, detachable platforms which may be used in accordance with any of the foregoing embodiments.
Figure 14B:
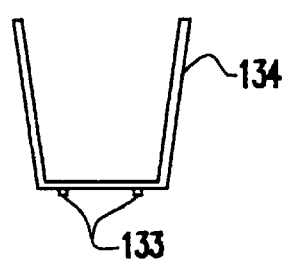
Figure 14C:
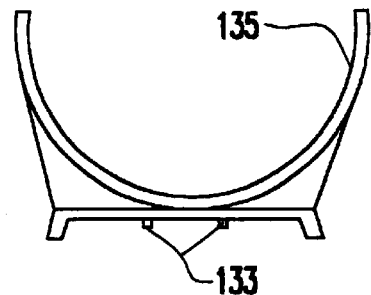

Also, in any or all of the foregoing embodiments, the weighing platform may be removably connected to the pivot arm of the weighing unit so that platforms/containers of other shapes and sizes may be used. For example, as shown in FIG. 14(*a*), in the embodiment of FIG. 12, a surface 130 having slots 131 may be fixed to support shafts 114. Platform 111 may then be detachably mounted onto surface 130 by inserting dual members 133 into slots 131. Preferably, members 133 snap into the slots to retain platform 111 on surface 130, and to allow platform 111 to be removed to allow platforms of other configurations to be used for weighing items of mail, such as platforms 134 and 135 shown in FIGS. 14(*b*) and 14(*c*), respectively.

Further, while all the above embodiments contemplate integrating the electronic scale of the present invention into office equipment, those skilled in the art can appreciate that the invention may just as easily be integrated into other types of equipment to achieve the objects and advantages described herein. For example, if desired, the scale of the present invention including the aforementioned LCD display may be integrated into the housing of a kitchen appliance, workshop tool, lamp, desk or the like.

Figure 15:
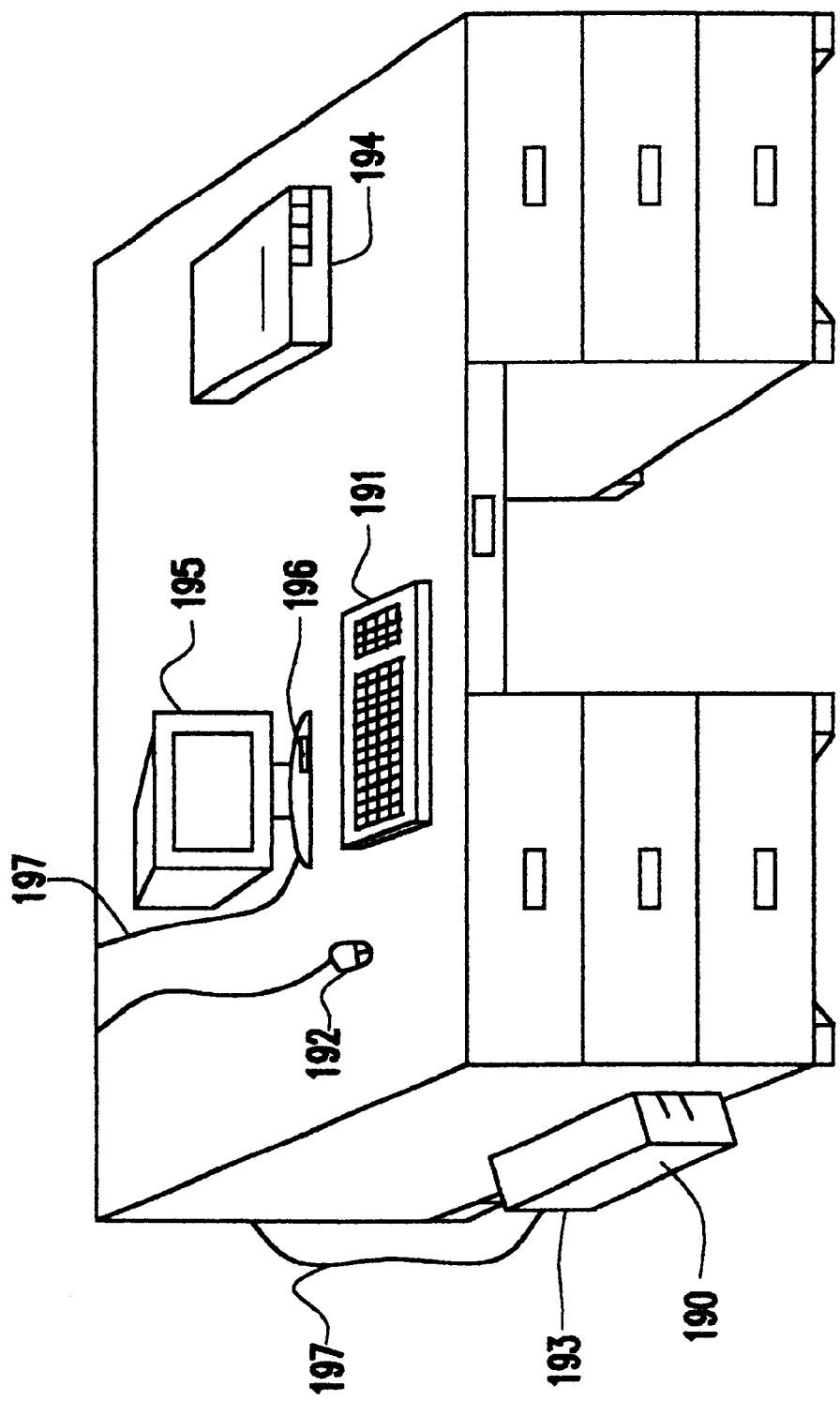
FIG. 15 is a conceptual diagram of a system for computing postal and carrier rates in accordance with the present invention.

Referring to FIG. 15, a system for computing postal/carrier rates in accordance with the present invention includes a personal computer 190, a keyboard 191, a mouse 192, a CPU 193, a printer 194, and a display 195 which may be a flat-panel display or a CRT monitor. Advantageously, the electronic scale of the present invention may be integrally formed into any one of the CPU, printer, and display to enhance the degree of integration of the system above all systems conventionally known.

For the sake of illustration, FIG. 15 has been drawn to show electronic scale 196 of the present invention within display 195. As such, signal lines 197 leading from the display convey weight measurement signals to the CPU of the computer, which is running a computer program for converting the signals into a postal carrier rate. Preferably, the program is equipped with or at least is adapted to interface to graphic interface software that will allow a user to perform a variety of functions once the postage has been computed. These functions may include directing a printer to print a postage mark directly onto an envelope or to a label which can be affixed onto the item weighed. Also, if desired, the printer may print address and/or postal bar codes.

The method of the present invention automatically determines postal/private carrier rates for letters, packages, and other parcels weighed in accordance with the system of the present invention. Preferably, the steps of the method are implemented in accordance with the aforementioned computer program. For convenience and efficiency reasons, this program may be designed to be interactive in nature. Further, to achieve compatibility with most personal computer systems in use today, the computer program may be a Windows application program initiated by clicking an icon on a computer screen. Those skilled in the art can appreciate, however, that the computer program may be in a form compatible with any operating system or type of computer.

Figure 16:
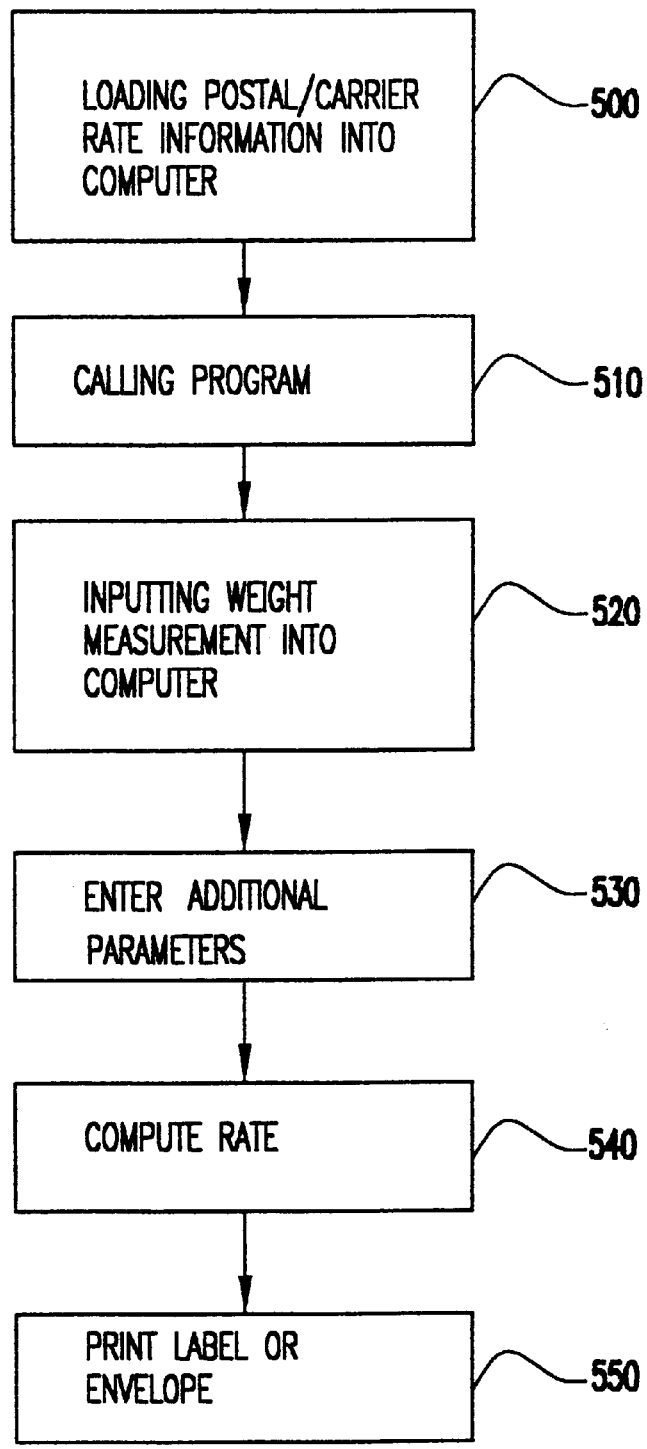
FIG. 16 is a flow diagram showing steps included in the method of the present invention.

FIG. 16 is a flow diagram setting forth steps of the method of the present invention. As shown, a first step includes loading postal/carrier rate information into the personal computer. (Block 500). This rate information may include rates based on weight, class, and zone including domestic and international addresses. Further, the rates may be loaded into the computer from a disk, an Internet web-site, or other such medium or source. Rate information may also be manually entered, if desired.

A second step of the method includes calling the computer program. (Block 510). This can be achieved simply by clicking on an icon on a computer screen. Alternatively, for enhanced convenience and ease of use, the program may be initiated merely by placing a letter onto the platform of the weighing device. Under these circumstances, the weight measurement signals output from the electronic scale may be used to automatically call the computer program, with nothing more required from the user.

A third step of the method includes inputting the weight of an item to be mailed into the computer program. (Block 520). This is performed merely by placing the item on the platform of the electronic scale. The weight measurement signals derived from the scale are received by the program, for example, through a communications port of the personal computer. The program converts these signals into a weight value which may then be displayed for the user's convenience.

A fourth step of the method includes having the user enter parameters relevant to determining the appropriate rate for the item being mailed. (Step 530). These parameters include those conventionally known, such as class of mail and zone. If desired, the third and fourth steps may be reversed in order, so that the postal parameters are entered by the user before the weight of the item is received by the program.

A fifth step of the method includes computing the postal/carrier rate for the item to be mailed based on the weight and parameters entered during the third and fourth steps. (Block 540). This step may be performed in accordance with any of a variety of known methods for computing the rate.

A sixth step of the method includes directing a printer, label-maker, or the like to print out an envelope or label bearing the computed postage or carrier charge, and/or address and postal bar code information. (Block 550).

As previously noted, the method of the present invention may be interactive in nature. FIGS. 17–21 set forth a series of display screens which may be used to request the user to enter information relevant to the rate calculation. As shown, these screens may include at least the following screens displayed in seriatim.

Figure 17:
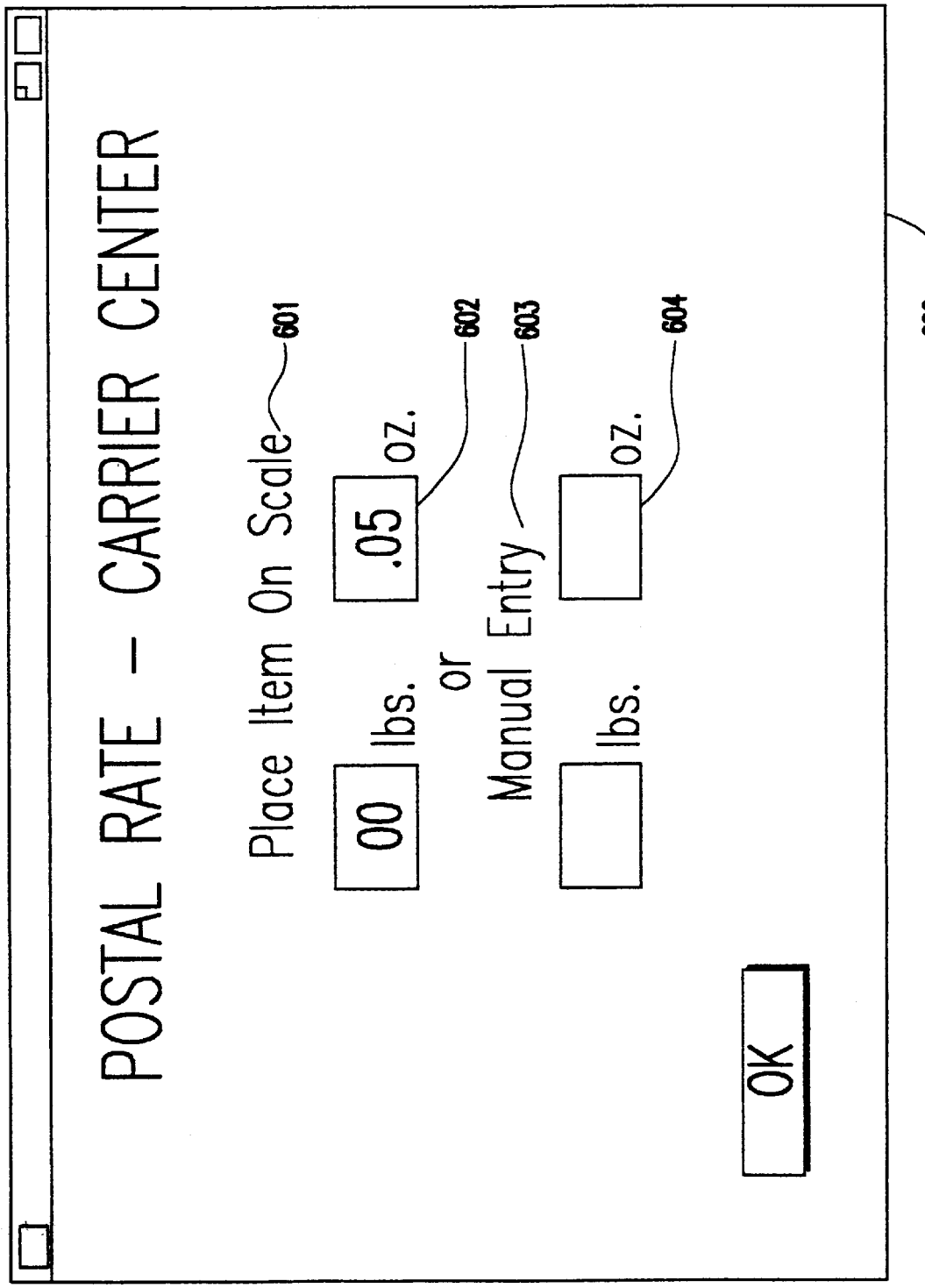
FIGS. 17–21 show a series of display screens which may be used to implement the steps of the method of the present invention.

Referring to FIG. 17, screen 600 includes a message 601 instructing the user to place an item of mail on the electronic scale of the present invention, and a window 602 for automatically displaying the weight of the item in accordance with the method of the present invention. An optional message 603 may be displayed to request the user to manually enter the weight of the item in window 604, if she or he so desires. An "OK" window may then be selected upon display of the weight to cause the next screen to be displayed.

Figure 18:
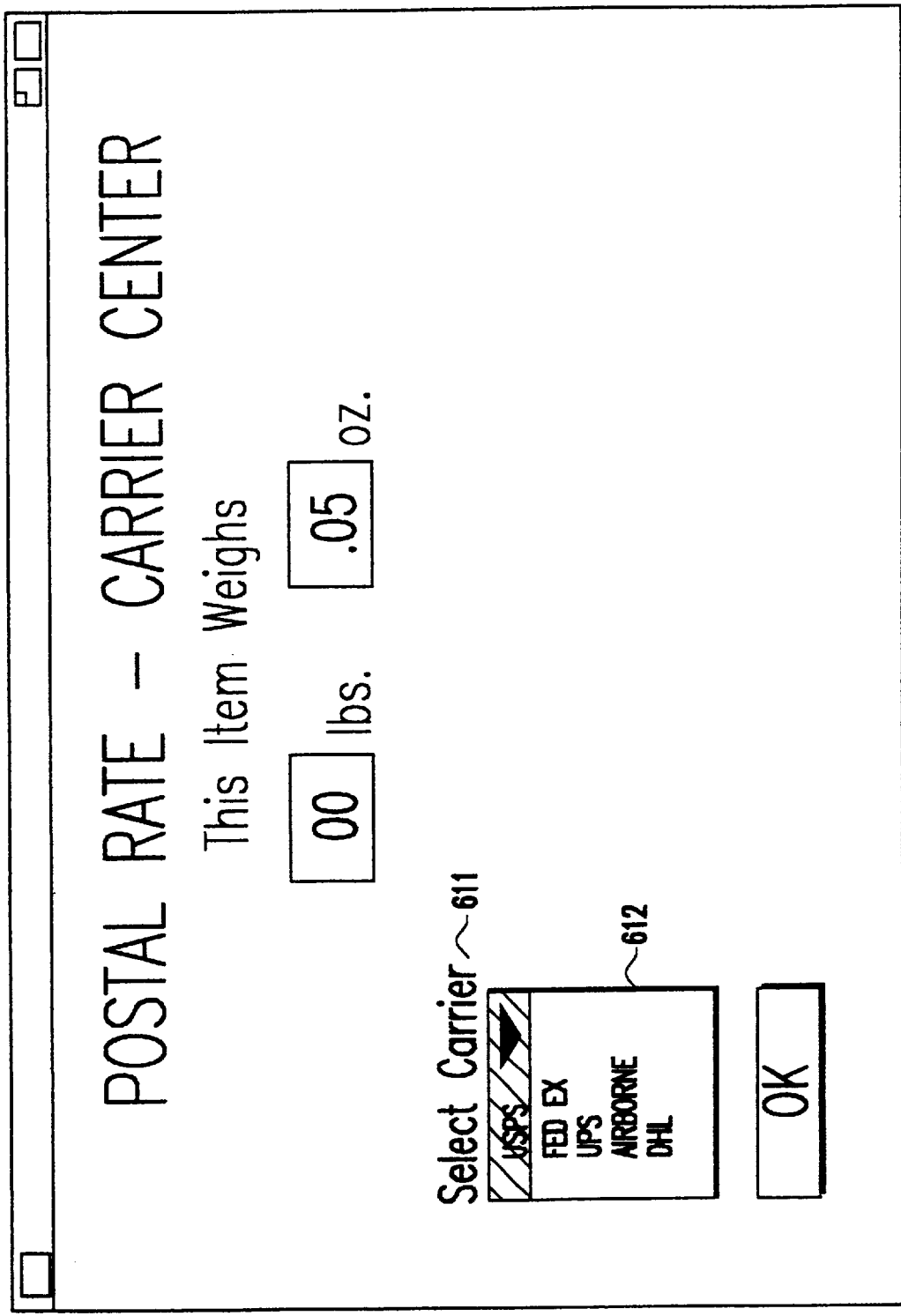

Referring to FIG. 18, screen 610 includes a "Select Carrier" message 611 which requests the user to select one of a plurality of mail carriers, including the U.S. Postal Service or any of a variety of private couriers such as Federal Express, RPS, Emory, AirBorne, and UPS and the like. For convenience, a window 612 is provided beneath message 611 to provide a drop-down menu of the mail carrier options when window 612 is actuated.

Figure 19:
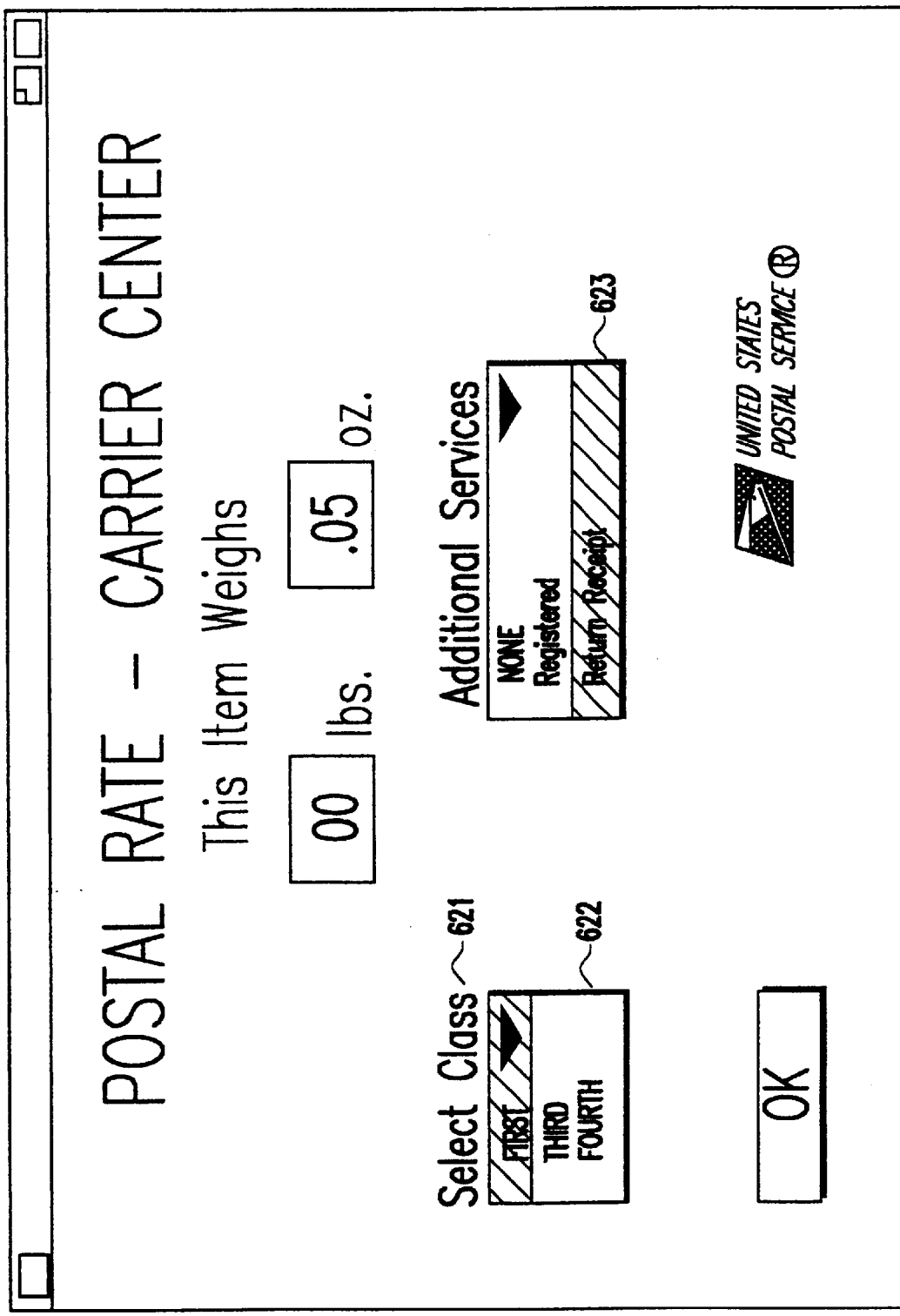

Referring to FIG. 19, screen 620 includes a "Select Class" message 621 for requesting the user to designate the class of mail to be used from a menu 622. An "Additional Services" window 623 may also be provided, if desired. When all information has been entered in this screen, the "OK" window may be designated to cause the next screen to be displayed.

Figure 20:

Referring to FIG. 20, when all of the necessary parameters have been entered, a screen 630 is displayed showing the rate corresponding to the item to be mailed. This rate may include a "First Class" rate in window 631, a "Return Receipt" window 632, and a "Total Rate" in window 633. An "OK" window 634 may then be selected to cause a label or envelope bearing a rate mark and/or address and postal bar code information to be printed.

Figure 21:
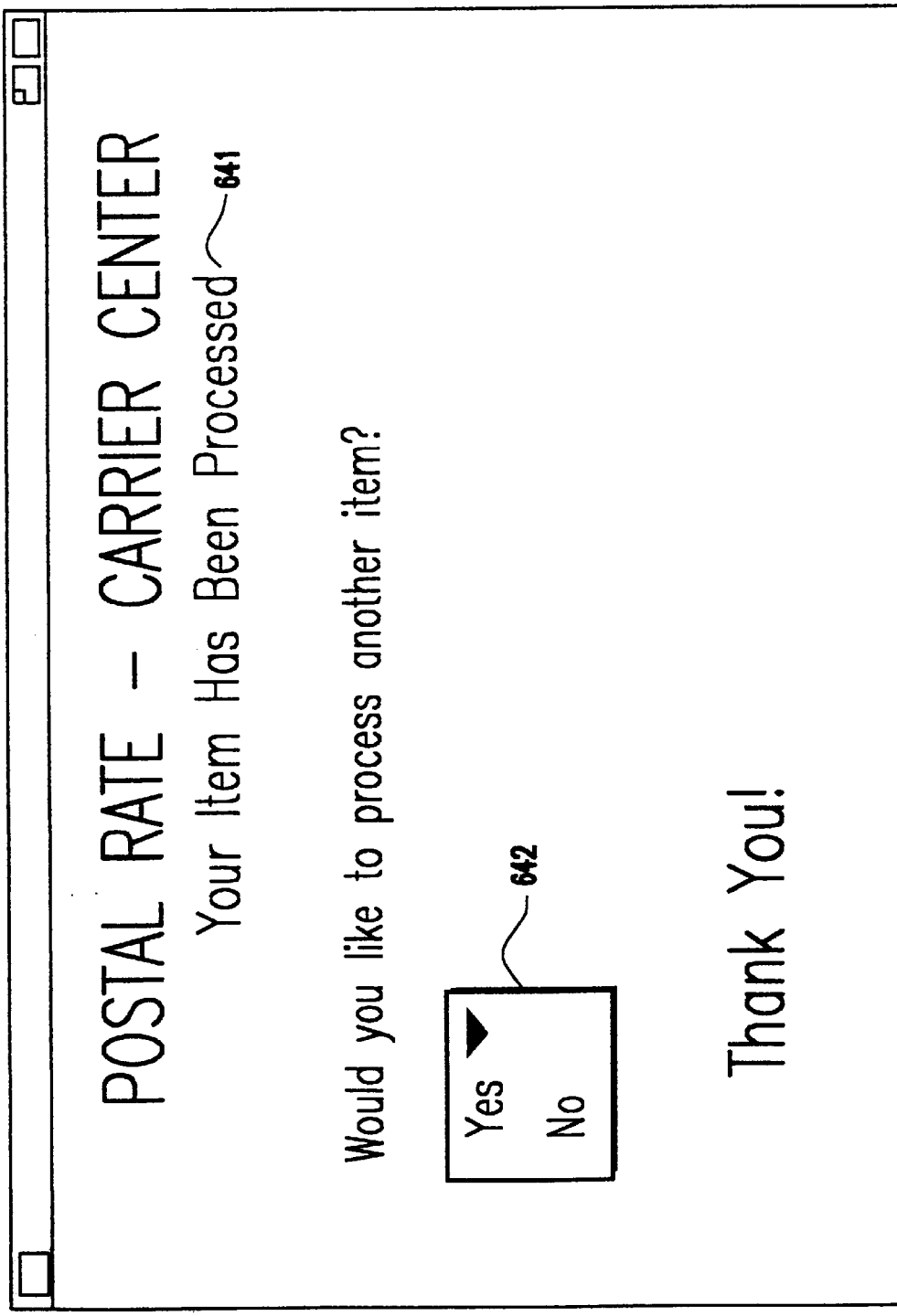

Referring to FIG. 21, when the rate mark has been generated, a confirmation screen 640 is displayed along with a message 641 informing the user that the rate information has been processed. A window 642 is then gives the user an option to compute postage for additional items to be mailed or shipped.

Optionally, a single, comprehensive display screen may be used in accordance with the method of the present invention, such as the one shown in FIG. 22.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention.

What is claimed is:

1. An electronic scale integrally formed within a flat-panel display, comprising:

a platform for supporting an item; and a weighing unit mounted at least partially within a housing of said flat-panel display, said weighing unit including:

at least one support member in contact with said platform, at least a portion of said platform being exposed along an exterior surface of said housing; and a force transducer mounted within said housing at a position adjacent said support member, said support member impinging upon said force transducer when said item is placed on said platform to cause said force transducer to output a weight signal indicative of a weight of said item.

2. The electronic scale of claim 1, wherein said support member is removably connected to said platform, to thereby allow at least a second platform of different dimensions to be connected to said support member.

3. The electronic scale of claim 1, further comprising:

a display mounted to the housing of said flat-panel display; and signal lines for conveying said weight signal to said display so that said display displays the weight of said item.

4. The electronic scale of claim 1, wherein said platform forms a bottom surface of a container having side walls connected to said platform for holding said item.

5. The electronic scale of claim 1, wherein said weighing unit includes a pivot mount fixed to an interior surface of said housing, said support member having a first end rotatably connected to said pivot mount and a second end in contact with a bottom surface of said platform, said force transducer outputting said weight signal when said support member impinges upon said force transducer under weight of said item on said platform.

6. The electronic scale of claim 5, wherein said housing of said flat-panel display includes a base, and wherein said pivot mount is fixed to an interior surface of said base and the second end of said support member is connected to said platform through a slot in said base.

7. An electronic scale integrally formed within a housing of a printer, comprising:
   a platform for supporting an item;
   a weighing unit mounted at least partially within a housing of said printer, said weighing unit including:
   a force transducer mounted within said housing at a position underneath said platform, and
   two support members for supporting said platform, each of said two support members having a first end connected to said platform and a second end within an interior of said housing, said support members deflecting to allow said platform to impinge upon said force transducer when said item is placed on said platform, said force transducer outputting weight signals corresponding to a weight of said item.

8. The electronic scale of claim 7, further comprising:
   two bias springs mounted on respective ones of said two support members, said bias springs compressing to allow said platform to impinge upon said force transducer when said item is placed on said platform.

9. A system for computing a postal or carrier rate, comprising:
   a piece of office equipment selected from the group consisting of a flat-panel display unit, a CRT monitor, a CPU unit of a personal computer, and a printer,
   an electronic scale integrally formed within a housing of said piece of office equipment, said electronic scale including:
   (a) a platform for supporting an item; and
   (b) a weighing unit mounted at least partially within the housing of said piece of office equipment, said weighing unit including:
      (i) at least one support member in contact with said platform, at least a portion of said platform being exposed along an exterior surface of said housing, and
      (ii) a force transducer mounted within said housing at a position adjacent said support member, said support member impinging upon said force transducer when said item is placed on said platform to cause said force transducer to output a weight signal indicative of a weight of said item; and
   a processor for computing a postal or carrier rate for said item based on said weight signal.

10. The system of claim 9, further comprising:
    a printer for printing one of a label or envelope bearing a mark indicative of said postal or carrier rate.

11. A method for computing a postal or carrier rate, comprising:
    integrating an electronic scale into a housing of a piece of office equipment selected from the group consisting of a flat-panel display unit, a CRT monitor, a CPU unit of a personal computer, and a printer;
    weighing an item on said electronic scale to derive a weight signal;
    conveying a weight signal to a processor;
    entering at least one parameter relating to a method of delivering said item; and
    computing a postal or carrier rate based on said weight signal and said at least one parameter.

12. The method of claim 11, further comprising:
    printing one of a label or envelope bearing a mark indicative of said postal or carrier rate.

13. The method of claim 11, wherein said computing step is performed in accordance with a computer program which causes a computer display to generate at least one display screen for allowing a user to enter said at least one parameter upon request, said computer further causing said computer display to display a weight of said item and said postal or carrier rate.

14. An electronic scale integrally formed within a CRT monitor, comprising:
    a platform for supporting an item; and
    a weighing unit mounted at least partially within a housing of said CRT monitor, said weighing unit including:
    at least one support member in contact with said platform, at least a portion of said platform being exposed along an exterior surface of said housing; and
    a force transducer mounted within said housing at a position adjacent said support member, said support member impinging upon said force transducer when said item is placed on said platform to cause said force transducer to output a weight signal indicative of a weight of said item.

15. The electronic scale of claim 14, wherein said support member is removably connected to said platform, to thereby allow at least a second platform of different dimensions to be connected to said support member.

16. The electronic scale of claim 14, wherein said platform forms a bottom surface of a container having side walls connected to said platform for holding said item.

17. The electronic scale of claim 14, wherein said weighing unit includes a pivot mount fixed to an interior surface of said housing, said support member having a first end rotatably connected to said pivot mount and a second end in contact with a bottom surface of said platform, said force transducer outputting said weight signal when said support member impinges upon said force transducer under weight of said item on said platform.

18. The electronic scale of claim 17, wherein said housing of said CRT monitor includes a base, and wherein said pivot mount is fixed to an interior surface of said base and the second end of said support member is connected to said platform through a slot in said base.

19. The electronic scale of claim 14, wherein said CRT monitor has a display screen, and wherein said weighing unit includes two support members and two pivot mounts fixed to an interior surface of said housing, each of said support members having a first end rotatably connected to a respective one of said pivot mounts and a second end connected to one of two opposing sides of said platform, said force transducer outputting said weight signal when said support members move under weight of said item on said platform.

20. The electronic scale of claim 19, wherein the second end of said two support members are rotatably connected to respective ones of said pivot mounts to allow said platform to rotate into a level position.

21. The electronic scale of claim 19, wherein said two support members include a third support member, disposed beneath said platform, for connecting said two support arms, said third support member impinging upon said force transducer under weight of said item on said platform.

22. An electronic scale integrally formed within a CPU unit of a personal computer, comprising:
    a platform for supporting an item; and
    a weighing unit mounted at least partially within a housing of said CPU unit of said personal computer, said weighing unit including:

at least one support member in contact with said platform, at least a portion of said platform being exposed along an exterior surface of said housing; and a force transducer mounted within said housing at a position adjacent said support member, said support member impinging upon said force transducer when said item is placed on said platform to cause said force transducer to output a weight signal indicative of a weight of said item.

23. The electronic scale of claim 22, wherein said support member is removably connected to said platform, to thereby allow at least a second platform of different dimensions to be connected to said support member.

24. The electronic scale of claim 22, wherein said platform forms a bottom surface of a container having side walls connected to said platform for holding said item.

25. The electronic scale of claim 22, wherein said weighing unit includes a pivot mount fixed to an interior surface of said housing, said support member having a first end rotatably connected to said pivot mount and a second end in contact with a bottom surface of said platform, said force transducer outputting said weight signal when said support member impinges upon said force transducer under weight of said item on said platform.

26. The electronic scale of claim 25, wherein said housing of said CPU unit includes a base, and wherein said pivot mount is fixed to an interior surface of said base and the second end of said support member is connected to said platform through a slot in said base.

27. An electronic scale integrally formed within a printer, comprising:

a platform for supporting an item; and a weighing unit mounted at least partially within a housing of said printer, said weighing unit including:

at least one support member in contact with said platform, at least a portion of said platform being exposed along an exterior surface of said housing; and a force transducer mounted within said housing at a position adjacent said support member, said support member impinging upon said force transducer when said item is placed on said platform to cause said force transducer to output a weight signal indicative of a weight of said item.

28. The electronic scale of claim 27, wherein said printer has a discharge area for holding paper after printing, said platform located adjacent said discharge area, and wherein said weighing unit is within said printer and includes a pivot mount fixed to an interior surface of said area, said support member having a first end rotatably connected to said pivot mount and a second end in contact with a bottom surface of said platform, said force transducer outputting said weight signal when said support member impinges upon said force transducer under weight of said item on said platform.

29. The electronic scale of claim 27, wherein said printer has a discharge area for holding paper after printing, wherein said weighing unit is within said printer and includes a pivot mount fixed to an interior surface of said area, said support member having a first end rotatably connected to said pivot mount and a second end in contact with a bottom surface of said platform, and wherein said platform is at least substantially coextensive with said discharge area, so that when said paper is discharged from said printer said paper is in a position to be weighed while resting in said discharge area, said force transducer outputting said weight signal when said support member impinges upon said force transducer under weight of said item on said platform.

30. The electronic scale of claim 27, wherein said support member is removably connected to said platform, to thereby allow at least a second platform of different dimensions to be connected to said support member.

31. The electronic scale of claim 27, wherein said platform forms a bottom surface of a container having side walls connected to said platform for holding said item.

32. The electronic scale of claim 27, wherein said weighing unit includes a pivot mount fixed to an interior surface of said housing, said support member having a first end rotatably connected to said pivot mount and a second end in contact with a bottom surface of said platform, said force transducer outputting said weight signal when said support member impinges upon said force transducer under weight of said item on said platform.

33. The electronic scale of claim 32, wherein said housing of said printer includes a base, and wherein said pivot mount is fixed to an interior surface of said base and the second end of said support member is connected to said platform through a slot in said base.

34. An electronic scale integrally formed within a housing of a CPU unit of a personal computer, comprising:

a platform for supporting an item;

a weighing unit mounted at least partially within a housing of said CPU unit of said personal computer, said weighing unit including:

a force transducer mounted within said housing at a position underneath said platform, and two support members for supporting said platform, each of said two support members having a first end connected to said platform and a second end within an interior of said housing, said support members deflecting to allow said platform to impinge upon said force transducer when said item is placed on said platform, said force transducer outputting weight signals corresponding to a weight of said item.

35. The electronic scale of claim 34, further comprising:

two bias springs mounted on respective ones of said two support members, said bias springs compressing to allow said platform to impinge upon said force transducer when said item is placed on said platform.

\* \* \* \* \*